United States Patent
Kim

(10) Patent No.: US 12,302,700 B2
(45) Date of Patent: May 13, 2025

(54) DISPLAY APPARATUS, AND APPARATUS FOR AND METHOD OF MANUFACTURING THE SAME

(71) Applicant: SAMSUNG DISPLAY CO., LTD., Yongin-si (KR)

(72) Inventor: Inbae Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 248 days.

(21) Appl. No.: 17/937,712

(22) Filed: Oct. 3, 2022

(65) Prior Publication Data

US 2023/0031774 A1     Feb. 2, 2023

Related U.S. Application Data

(62) Division of application No. 16/828,874, filed on Mar. 24, 2020, now abandoned.

(30) Foreign Application Priority Data

Jul. 16, 2019   (KR) .................. 10-2019-0085820

(51) Int. Cl.
| | |
|---|---|
| H10K 59/121 | (2023.01) |
| H04L 9/40 | (2022.01) |
| H10K 59/123 | (2023.01) |
| H10K 59/131 | (2023.01) |
| H10K 71/00 | (2023.01) |

(52) U.S. Cl.
CPC ........... *H10K 59/121* (2023.02); *H04L 63/10* (2013.01); *H04L 63/102* (2013.01); *H04L 63/104* (2013.01); *H04L 63/20* (2013.01); *H10K 59/123* (2023.02); *H10K 59/131* (2023.02); *H10K 71/00* (2023.02)

(58) Field of Classification Search
CPC ........................ H10K 59/121; H10K 59/131
See application file for complete search history.

(56) References Cited

U.S. PATENT DOCUMENTS

| | | |
|---|---|---|
| 8,318,389 B2 | 11/2012 | Nam et al. |
| 9,257,667 B2 | 2/2016 | Cho et al. |
| 9,289,798 B2 | 3/2016 | Park et al. |
| 9,490,311 B2 | 11/2016 | Park et al. |
| 9,911,941 B2 | 3/2018 | Choi et al. |

(Continued)

FOREIGN PATENT DOCUMENTS

| | | |
|---|---|---|
| CN | 104701338 A | 6/2015 |
| CN | 107425039 A | 12/2017 |

(Continued)

OTHER PUBLICATIONS

Chinese Office Action dated Sep. 14, 2024, issued in Chinese Patent Application No. 202010672816.4, 8 pages.

*Primary Examiner* — Douglas M Menz
(74) *Attorney, Agent, or Firm* — Womble Bond Dickinson (US) LLP

(57) ABSTRACT

A display apparatus includes: a substrate comprising a first display area including a first pixel area, a second pixel area, and a first transmission area, a second display area adjacent to the first display area, the second display area including a third pixel area, a fourth pixel area, a second transmission area, and a third transmission area, and a third display area adjacent to the second display area.

8 Claims, 21 Drawing Sheets

(56) References Cited

U.S. PATENT DOCUMENTS

| | | |
|---|---|---|
| 10,290,694 B2 | 5/2019 | Xiang et al. |
| 10,818,877 B2 | 10/2020 | Hong et al. |
| 11,004,906 B2 | 5/2021 | Lan et al. |
| 11,069,876 B2 | 7/2021 | Gil |
| 11,462,590 B2 | 10/2022 | Fan et al. |
| 11,469,276 B2 * | 10/2022 | Jeon ............... H10K 71/00 |
| 2003/0012981 A1 | 1/2003 | Yamada et al. |
| 2006/0011136 A1 | 1/2006 | Yamazaki et al. |
| 2008/0100204 A1 | 5/2008 | Kim |
| 2008/0118743 A1 | 5/2008 | Lee et al. |
| 2014/0242737 A1 | 8/2014 | Chung et al. |
| 2015/0060807 A1 | 3/2015 | Koshihara et al. |
| 2015/0102305 A1 | 4/2015 | Jung et al. |
| 2016/0322595 A1 | 11/2016 | Choi et al. |
| 2016/0369389 A1 | 12/2016 | Ko et al. |
| 2018/0031927 A1 | 2/2018 | Ikeda et al. |
| 2018/0129328 A1 | 5/2018 | Park et al. |
| 2018/0211998 A1 | 7/2018 | Hideo et al. |
| 2018/0308412 A1 | 10/2018 | Wu et al. |
| 2021/0327972 A1 | 10/2021 | Lou et al. |

FOREIGN PATENT DOCUMENTS

| | | |
|---|---|---|
| CN | 108010947 A | 5/2018 |
| CN | 108155204 A | 6/2018 |
| CN | 108258153 A | 7/2018 |
| CN | 108269840 A | 7/2018 |
| CN | 108810200 A | 11/2018 |
| DE | 102018127655 A1 | 7/2019 |
| JP | 2003-17254 A | 1/2003 |
| JP | 2006-28583 A | 2/2006 |
| JP | 2008-111183 A | 5/2008 |
| JP | 2008-244478 A | 10/2008 |
| JP | 2009-289474 A | 12/2009 |
| JP | 2018-26344 A | 2/2018 |
| JP | 2018-109219 A | 7/2018 |
| KR | 10-2011-0101980 A | 9/2011 |
| KR | 10-1379650 B1 | 4/2014 |
| KR | 10-2014-0107928 A | 9/2014 |
| KR | 10-2014-0130965 A | 11/2014 |
| KR | 10-2016-0130042 A | 11/2016 |
| KR | 10-2017-0000058 A | 1/2017 |
| KR | 10-1919467 B1 | 2/2019 |

* cited by examiner

DISPLAY APPARATUS, AND APPARATUS FOR AND METHOD OF MANUFACTURING THE SAME

CROSS-REFERENCE TO RELATED APPLICATIONS

This application is a divisional of U.S. patent application Ser. No. 16/828,784, filed Mar. 24, 2020, which claims priority to and the benefit of Korean Patent Application No. 10-2019-0085820, filed Jul. 16, 2019, the entire content of both of which is incorporated herein by reference.

FIELD

Aspects of some example embodiments of the present disclosure relate to a display apparatus and a method of manufacturing the same.

DESCRIPTION OF RELATED ART

Display apparatuses may be used for various purposes. Also, because the thickness and weight of display apparatuses has reduced as technology has progressed, the utilization range of display apparatuses has increased.

Depending on the use of a display apparatus, different methods may be utilized for designing the shape thereof and different functions may be embedded in or linked to the display apparatus.

The above information disclosed in this Background section is only for enhancement of understanding of the background and therefore the information discussed in this Background section does not necessarily constitute prior art.

SUMMARY

One or more example embodiments includes a display apparatus including a sensor area in which a sensor, or other suitable components, may be arranged in a display area. Some example embodiments may further include an apparatus for manufacturing a display apparatus, and a method of manufacturing a display apparatus. However, the above technical features are merely examples and the scope of the disclosure is not limited thereto.

Additional aspects will be set forth in part in the description which follows and, in part, will be more apparent from the description, or may be learned by practice of the presented example embodiments of the disclosure.

According to some example embodiments, a display apparatus includes a substrate including a first display area including a first pixel area, a second pixel area, and a first transmission area, a second display area arranged adjacent to the first display area, the second display area including a third pixel area, a fourth pixel area, a second transmission area, and a third transmission area, and a third display area arranged adjacent to the second display area, first pixels arranged on the first pixel area, each of the first pixels including a first pixel electrode, a first opposite electrode, and a first intermediate layer between the first pixel electrode and the first opposite electrode, second pixels arranged on the second pixel area, each of the second pixels including a second pixel electrode, a second opposite electrode, and a second intermediate layer between the second pixel electrode and the second opposite electrode, third pixels arranged on the third pixel area, each of the third pixels including a third pixel electrode, a third opposite electrode, and a third intermediate layer between the third pixel electrode and the third opposite electrode, and fourth pixels arranged on the fourth pixel area, each of the fourth pixels including a fourth pixel electrode, a fourth opposite electrode, and a fourth intermediate layer between the fourth pixel electrode and the fourth opposite electrode, wherein the third opposite electrode is connected to the first opposite electrode or the second opposite electrode, the third opposite electrode and the fourth opposite electrode are connected to each other, and the third opposite electrode and the fourth opposite electrode have different planar areas from each other.

According to some example embodiments, the first pixel area, the second pixel area, and the first transmission area may be alternately arranged as a grating.

According to some example embodiments, the first transmission area may be defined as the first pixel area and the second pixel area connected to each other.

According to some example embodiments, the first opposite electrode and the second opposite electrode may be partially in surface contact with each other.

According to some example embodiments, the second opposite electrode may be arranged on the first opposite electrode in a surface contact area.

According to some example embodiments, the first transmission area and the third transmission area may have different shapes from each other.

According to some example embodiments, a light transmittance of the first display area may be different from a light transmittance of at least one of the second display area or the third display area.

According to some example embodiments, the first display area may provide an image having a resolution lower than a resolution of an image provided by at least one of the second display area or the third display area.

According to some example embodiments, main pixels may be arranged on the third display area, each of the main pixels may include a main pixel electrode, a main opposite electrode, and a main intermediate layer between the main pixel electrode and the main opposite electrode, and the main opposite electrode may be arranged on entire surface of the third display area.

According to some example embodiments, the main opposite electrode may be connected to the fourth opposite electrode on the second display area.

According to some example embodiments, a plurality of main opposite electrodes having stripe shapes may be provided, and the plurality of main opposite electrodes may be spaced apart from one another.

According to some example embodiments, a display apparatus includes a substrate including a first display area including a first pixel area, a second pixel area, and a first transmission area, a second display area arranged adjacent to the first display area, the second display area including a third pixel area, a fourth pixel area, a second transmission area, and a third transmission area, and a third display area arranged adjacent to the second display area, first pixels arranged on the first pixel area, each of the first pixels including a first pixel electrode, a first opposite electrode, and a first intermediate layer between the first pixel electrode and the first opposite electrode, second pixels arranged on the second pixel area, each of the second pixels including a second pixel electrode, a second opposite electrode, and a second intermediate layer between the second pixel electrode and the second opposite electrode, third pixels arranged on the third pixel area, each of the third pixels including a third pixel electrode, a third opposite electrode, and a third intermediate layer between the third pixel electrode and the third opposite electrode, fourth pixels arranged on the fourth pixel area, each of the fourth pixels including a fourth pixel electrode, a fourth opposite electrode, and a fourth intermediate layer between the fourth pixel electrode and the fourth opposite electrode, and a component arranged on a surface of the substrate so as to correspond to the first display area, the component including an electronic element emitting or receiving light, wherein the third opposite electrode is connected to the first opposite electrode or the second opposite electrode, the third opposite electrode and the fourth opposite electrode are connected to each other, and the third opposite electrode and the fourth opposite electrode have different planar areas from each other.

According to some example embodiments, the component may emit or receive light through the first transmission area, and a light transmittance of the second display area and a light transmittance of the third display area may be less than a light transmittance of the first display area.

According to some example embodiments, an apparatus for manufacturing a display apparatus, the apparatus includes, a chamber, a part of which is selectively open/closed, a first support arranged in the chamber, the first support supporting a substrate, a mask assembly arranged in the chamber, the mask assembly facing the substrate, a second support arranged in the chamber, the second support supporting the mask assembly, and a deposition source arranged in the chamber, the deposition source supplying a deposition material onto the substrate, wherein the mask assembly includes a first mask assembly and a second mask assembly that are replaceable with each other, the second mask assembly includes a mask frame, and a mask sheet mounted on the mask frame, and the mask sheet includes a first opening, a second opening arranged in a different portion from the first opening in the mask sheet, and a third opening arranged in a different portion from the first and second openings in the mask sheet, wherein the second opening is connected to the third opening, the first opening is separated from the second opening and the third opening, the first opening and the second opening have different shapes from each other, and an area of the first opening is less than an area of the second opening.

According to some example embodiments, the deposition source may be in a corner of the chamber.

According to some example embodiments, the first opening may have a square shape and the second opening may have a rectangular shape.

According to some example embodiments, at least one of the first support or the second support may adjust a position of the substrate relative to the first mask assembly.

According to some example embodiments, a plurality of third openings may be provided to be spaced from one another, and each of the plurality of third openings may be provided as a line shape.

According to some example embodiments, a method of manufacturing a display apparatus, the method includes arranging a substrate and a first mask assembly in a chamber, forming first opposite electrodes respectively on a first display area and a second display area of the substrate by using a deposition material that has been supplied from a deposition source and has passed through the first mask assembly, changing a position of at least one of the substrate or the first mask assembly, forming second opposite electrodes respectively on the first display area and the second display area by using the deposition material that has been supplied from the deposition source and has passed through the first mask assembly, the first opposite electrode and the second opposite electrode at least partially overlapping each other, and forming a third opposite electrode and a fourth opposite electrode on the second display area after replacing the first mask assembly with a second mask assembly and supplying a deposition material onto the substrate from the deposition source, and forming a main opposite electrode on a third display area of the substrate, wherein the third opposite electrode connects one of the first opposite electrode and the second opposite electrode to the fourth opposite electrode, and the third opposite electrode and the fourth opposite electrode have different planar areas from each other.

According to some example embodiments, a first transmission area may be provided between the first opposite electrode and the second opposite electrode.

According to some example embodiments, the first opposite electrode and the second opposite electrode may be partially in surface contact with each other.

According to some example embodiments, a second transmission area may be provided between one of the first opposite electrode and the second opposite electrode, the third opposite electrode and the fourth opposite electrode, and a third transmission area may be provided between one of the first opposite electrode and the second opposite electrode, the third opposite electrode, the fourth opposite electrode, and a main opposite electrode.

According to some example embodiments, the second transmission area and the third transmission area may have different shapes from each other.

According to some example embodiments, the first display area may provide an image having a resolution lower than a resolution of an image provided by at least one of the second display area or the third display area.

According to some example embodiments, a light transmittance of the first display area may be different from a light transmittance of at least one of the second display area or the third display area.

According to some example embodiments, the light transmittance of the second display area may be greater than the light transmittance of the first display area and less than the light transmittance of the third display area.

Other aspects, features and characteristics of the disclosure will become better understood through the accompanying drawings, the claims and the detailed description.

Such general and specific aspects of some example embodiments of the present disclosure may be performed using systems, methods, computer-readable storage mediums, and/or combinations thereof.

BRIEF DESCRIPTION OF THE DRAWINGS

The above and other aspects, features, and characteristics of certain example embodiments of the disclosure will be more apparent from the following description taken in conjunction with the accompanying drawings, in which.

DETAILED DESCRIPTION

Figure 1:
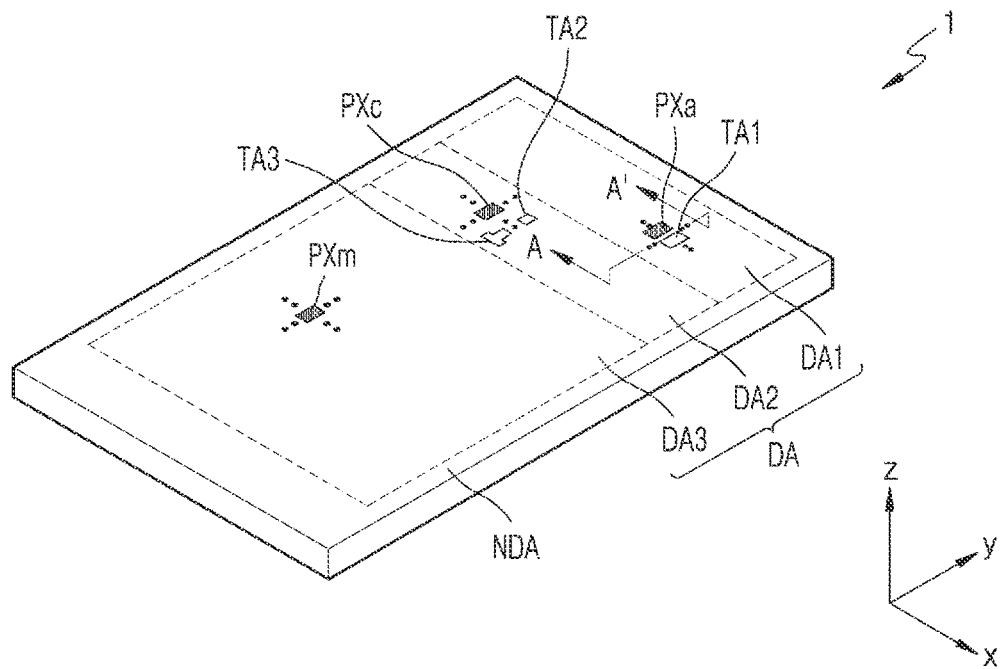
FIG. 1 is a perspective view of a display apparatus according to some example embodiments.

As the present disclosure allows for various changes and numerous embodiments, aspects of some example embodiments will be illustrated in the drawings and described in more detail in the written description. The attached drawings for illustrating one or more example embodiments are referred to in order to gain a sufficient understanding, the merits thereof, and some characteristics of some example embodiments. However, the example embodiments may have different forms and should not be construed as being limited to the descriptions set forth herein.

The example embodiments will be described below in more detail with reference to the accompanying drawings. Those components that are the same or are in correspondence are rendered the same reference numeral regardless of the figure number, and redundant explanations are omitted.

While such terms as "first," "second," etc., may be used to describe various components, such components are not be limited to the above terms. The above terms are used only to distinguish one component from another.

An expression used in the singular encompasses the expression of the plural, unless it has a clearly different meaning in the context.

In the present specification, it is to be understood that the terms "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when a layer, region, or component is referred to as being "formed on" another layer, region, or component, it may be directly or indirectly formed on the other layer, region, or component. That is, for example, intervening layers, regions, or components may be present.

Sizes of components in the drawings may be exaggerated for convenience of explanation. In other words, because sizes and thicknesses of components in the drawings are arbitrarily illustrated for convenience of explanation, the following embodiments are not limited thereto.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

FIG. 1 is a perspective view of a display apparatus 1 according to some example embodiments.

Referring to FIG. 1, the display apparatus 1 includes a display area DA that realizes (or displays) images and a non-display area NDA that does not realize (or does not display) images. The display area DA includes a first display area DA1, a second display area DA2, and a third display area DA3. The display apparatus 1 may provide a main image based on light emitted from a plurality of main pixels PXm arranged in the third display area DA3.

At least one of the first display area DA1 or the second display area DA2 may be an area under which a component such as a sensor using infrared rays, visible rays, or sound is arranged, as will be described in more detail below with reference to FIG. 2. Hereinafter, a case in which the component is arranged in the first display area DA1 will be described for convenience of description, but embodiments are not limited thereto.

Thus, according to some example embodiments, the display apparatus 1 may include a display area DA having a plurality of sub-display areas (e.g., DA1, DA2, and DA3, althought embodiments are not limited to three sub-display areas, and various embodiments may include any suitable number of sub-display areas according to the design of the display apparatus 1). One or more of the sub-display areas may be an area at which a plurality of main pixels PXm are arranged, for displaying images. Additionally, one or more of the sub-display areas may be an area at which images may be displayed by pixels, but also where one or more components (such as sensors or emitters) may be positioned in order to receive or sense input signals (e.g., light, sound, etc.) and/or to emit or transmit output signals (e.g., light, sound, etc.).

The first display area DA1 may include a first transmission area TA1, through which light and/or sound may be output or emitted from the component to the outside, or through which light and/or sound proceeding from an external source may be transmitted to the component may transmit. According to some example embodiments, when the light transmits through the first display area DA1, a light transmittance may be about 10% or greater, for example, 20% or greater, 25% or greater, 50% or greater, 85% or greater, or 90% or greater.

The light transmittance of the first display area DA1 may be different from at least one of a light transmittance of the second display area DA2 or a light transmittance of the third display area DA3. For example, the light transmittance of the first display area DA1 may be greater than that of the second display area DA2 or that of the third display area DA3. According to some example embodiments, the light transmittance of the first display area DA1 may be greater than that of the second display area DA2 and that of the third display area DA3. In this case, the light transmittance of the second display area DA2 may be greater than that of the third display area DA3. For example, the light transmittance of the second display area DA2 may be equal to an arithmetic mean of the sum of the light transmittance of the first display area DA1 and the light transmittance of the third display area DA3.

According to some example embodiments, a plurality of auxiliary pixels PXa may be arranged in the first display area DA1, and an image (e.g., a set or predetermined image) may be provided by using light emitted from the plurality of auxiliary pixels PXa. The image provided from the first display area DA1 is an auxiliary image having a lower resolution than that of an image provided from at least one of the second display area DA2 or the third display area DA3. That is, because the first display area DA1 includes the first transmission area TA1 through which the light and/or sound may transmit, the number of auxiliary pixels PXa arranged per unit area may be less than the number of connecting pixels PXc arranged per unit area in the second display area DA2 or the number of main pixels PXm per unit area in the third display area DA3. According to some example embodiments, the number of auxiliary pixels PXa arranged per unit area in the first display area DA1 may be less than that of the connecting pixels PXc arranged per unit area in the second display area DA2 and that of the main pixels PXm arranged per unit area in the third display area DA3. In this case, the number of connecting pixels PXc arranged per unit area in the second display area DA2 may be less than that of the main pixels PXm arranged per unit area in the third display area DA3.

Hereinafter, according to some example embodiments, although the display apparatus 1 is described as being an organic light-emitting display apparatus, the disclosure is not limited thereto. According to some example embodiments, the display apparatus 1 may be an inorganic light-emitting display, a quantum dot light-emitting display, etc.

Referring to FIG. 1, the first display area DA1 is at a side of the second display area DA2 of a rectangular shape, but is not limited thereto. The first display area DA1 may have a circular shape, an ellipse shape, or a polygonal shape such as a triangle, a pentagon, etc., and a location and the number of the first display area DA1 may be variously modified.

Figure 2:
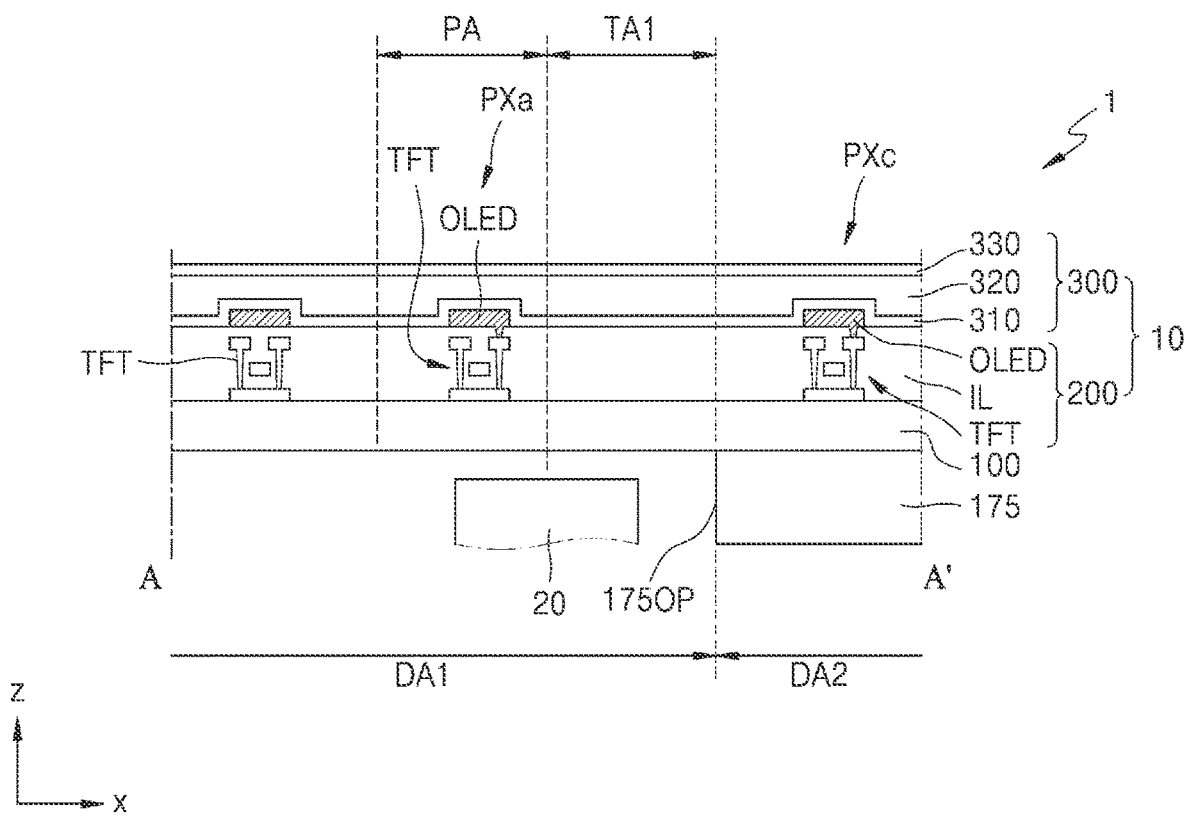
FIG. 2 is a cross-sectional view of a display apparatus according to some example embodiments.

FIG. 2 is a cross-sectional view of the display apparatus 1 according to some example embodiments. FIG. 2 may correspond to a cross-section taken along the line A-A' of FIG. 1.

Referring to FIG. 2, the display apparatus 1 may include a display panel 10 and a component 20, wherein the display panel 10 includes a display element and the component 20 is under the display panel 10 to correspond to the first display area DA1.

The display panel 10 may include a substrate 100, a display element layer 200 on the substrate 100, and a thin film encapsulation layer 300 that is an encapsulation member for sealing the display element layer 200. In addition, the display panel 10 may further include a lower protective film 175 arranged under the substrate 100.

The substrate 100 may include glass or a polymer resin. The polymer resin may include polyethersulfone, polyacrylate, polyetherimide, polyethylene n naphthalate, polyethylene terephthalate, polyphenylene sulfide, polyarylate, polyimide, polycarbonate, cellulose acetate propionate, etc. The substrate 100 including the polymer resin may be flexible, rollable, or bendable. The substrate 100 may have a multi-layered structure including a layer including the polymer resin and an inorganic layer.

The display element layer 200 may include a circuit layer including a thin film transistor TFT, an organic light-emitting diode OLED that is a display element, and an insulating layer IL between the thin film transistor TFT and the organic light-emitting diode OLED.

In the third display area DA3, the main pixels PXm each including the thin film transistor TFT and the organic light-emitting diode OLED connected to the thin film transistor TFT are arranged. In the second display area DA2, the connecting pixels PXc each including the thin film transistor TFT and the organic light-emitting diode OLED connected to the thin film transistor TFT are arranged. In the first display area DA1, the auxiliary pixels PXa each including the thin film transistor TFT and the organic light-emitting diode OLED connected to the thin film transistor TFT are arranged, and lines electrically connected to the main pixels PXm, the connecting pixels PXc, and the auxiliary pixels PXa may be arranged.

In addition, the first transmission area TA1, in which the thin film transistor TFT and pixels are not arranged, may be in the first display area DA1. The first transmission area TA1 may be understood as an area, through which light/signals emitted from the component 20 or light/signals incident to the component 20 transmit. Similarly to the first display area DA1, a second transmission area TA2 and a third transmission area TA3 may be in the second display area DA2.

The component 20 may be in the first display area DA1 and the second display area DA2. For example, the component 20 may be in the first display area DA1. The component 20 may be an electronic element using light or sound. For example, the component 20 may include a sensor receiving light, e.g., an infrared ray sensor, a sensor outputting and sensing light or sound to measure a distance or to sense fingerprints, etc., a small-sized lamp that emits light, or a speaker outputting sound. The electronic element using the light may use light of various wavelength bands such as visible light, IR, ultraviolet (UV) ray, etc. A plurality of components 20 may be in the first display area DA1. For example, a light-emitting device and a light-receiving device may be provided in one first display area DA1 as the components 20. Alternatively, one component 20 may include a light-emitting portion and a light-receiving portion.

The thin film encapsulation layer 300 may include at least one inorganic encapsulation layer and at least one organic encapsulation layer. In this regard, referring to FIG. 2, the thin film encapsulation layer 300 may include first and second inorganic encapsulation layers 310 and 330 and an organic encapsulation layer 320 between the first and second inorganic encapsulation layers 310 and 330.

The first and second inorganic encapsulation layers 310 and 330 may include one or more inorganic insulating materials from aluminum oxide, titanium oxide, tantalum oxide, hafnium oxide, zinc oxide, silicon oxide, silicon nitride, and silicon oxynitride. The organic encapsulation layer 320 may include a polymer-based material. The polymer-based material may include polyethylene terephthalate, polyethylene naphthalate, polycarbonate, polyimide, polyethylene sulfonate, polyoxymethylene, polyarylate, hexamethyl disiloxane, an acryl-based resin (e.g., polymethyl methacrylate, polyacrylic acid, etc.), or a combination thereof.

The lower protective film 175 is attached to a lower portion of the substrate 100 to protect and support the substrate 100. The lower protective film 175 may include an opening 175OP corresponding to the first display area DA1. Because the lower protective film 175 includes the opening 175OP, a light transmittance of the first display area DA1 may be improved. The lower protective film 175 may include polyethylene terephthalate (PET) or polyimide (PI).

An area of the first display area DA1 may be greater than that of a region where the component 20 is arranged. In FIG. 2, it is shown that the first display area DA1 has an area that is equal to that of the opening 175OP, but the area of the opening 175OP in the lower protective film 175 may not be equal to that of the first display area DA1. For example, the area of the opening 175OP may be less than that of the first display area DA1.

According to some example embodiments, components such as an input sensing member for sensing a touch input, an anti-reflection member including a polarizer and a retarder, or a color filter and a black matrix, a transparent window, etc. may be further arranged on the display panel 10.

In addition, according to some example embodiments, the thin film encapsulation layer 300 is used as an encapsulation member for sealing the display element layer 200, but one or more embodiments are not limited thereto. For example, an encapsulation substrate that is bonded to the substrate 100 via a sealant or a frit may be used as the member for encapsulating the display element layer 200.

Figure 3:
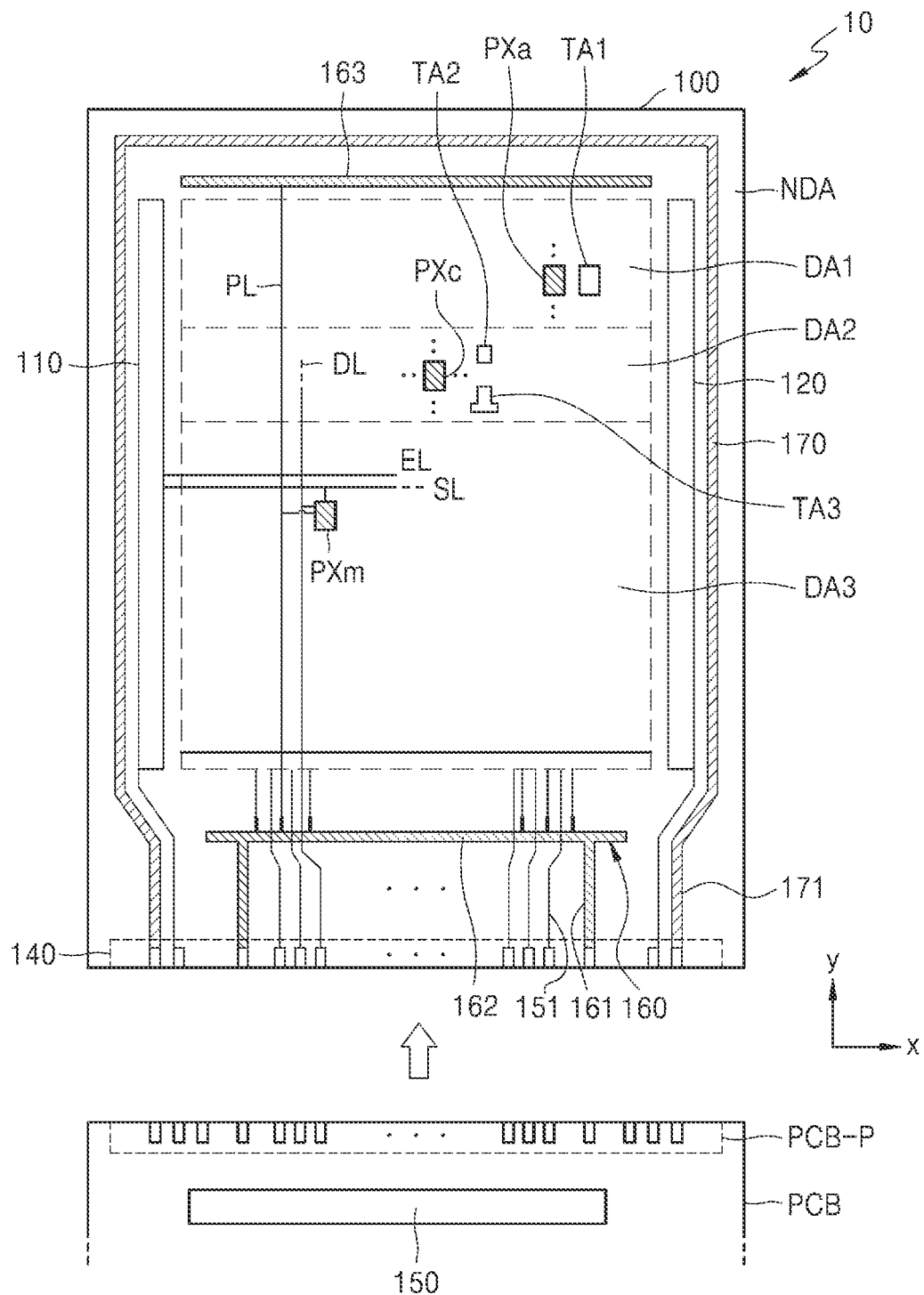
FIG. 3 is a plan view of a display panel according to some example embodiments.
Figure 4:
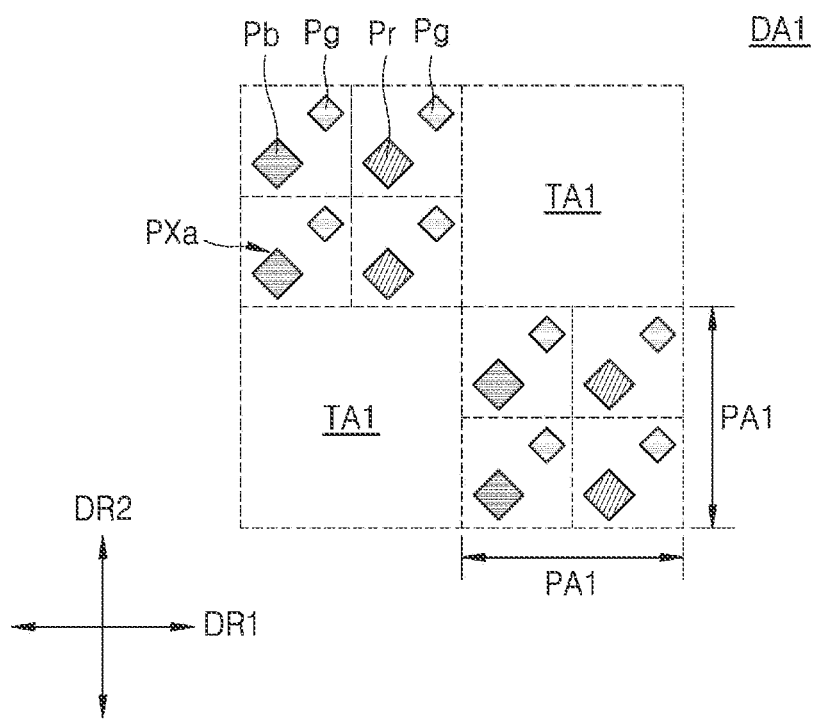
FIG. 4 is a plan view showing an enlarged view of a first display area of FIG. 3.

FIG. 3 is a plan view of the display panel 10 according to some example embodiments. FIG. 4 is a plan view showing an enlarged view of the first display area DA1 of FIG. 3.

Referring to FIGS. 3 and 4, various elements of the display panel 10 are on the substrate 100. The substrate 100 includes a display area and a non-display area NDA surrounding the display area. The display area includes the second display area DA2 and third display area DA3 on which a main image is displayed and the first display area DA1 including the first transmission area TA1 and displaying an auxiliary image.

The plurality of main pixels PXm are on the third display area DA3. And the plurality of connecting pixels PXc are on the second display area DA2. Each of the main pixels PXm and each of the connecting pixels PXc may include a display element such as an organic light-emitting diode OLED. Each of the main pixels PXm and each of the connecting pixels PXc may emit light (e.g., red light, green light, blue light, or white light) via the organic light-emitting diode OLED. In the specification, the main pixel PXm and each of the connecting pixels PXc may be understood as a pixel emitting red light, green light, blue light, or white light, as described above. The second display area DA2 and the third display area DA3 are covered by the encapsulation member described above with reference to FIG. 2, so as to be protected against external air or moisture.

The first display area DA1 may be at a side of the second display area DA2, and the plurality of auxiliary pixels PXa are in the first display area DA1. Each of the auxiliary pixels PXa may include a display element such as an organic light-emitting diode OLED. Each of the auxiliary pixels PXa may emit light, e.g., red light, green light, blue light, or white light, via the organic light-emitting diode OLED. In the specification, the auxiliary pixel PXa may be understood as a pixel emitting red light, green light, blue light, or white light, as described above. In addition, the first display area DA1 may include the first transmission area TA1 among the auxiliary pixels PXa.

Because the first display area DA1 includes the first transmission area TA1, a resolution of the first display area DA1 may be less than that of at least one of the second display area DA2 or the third display area DA3. For example, the resolution of the first display area DA1 may be half the resolution of at least one of the second display area DA2 or the third display area DA3. In some embodiments, the resolution of at least one of the second display area DA2 or the third display area DA3 may be 400 ppi or greater, and the resolution of the first display area DA1 may be about 200 ppi or greater.

The first display area DA1 will be described in more detail below with reference to FIG. 4.

The first display area DA1 may include an auxiliary pixel area PA1 including at least one auxiliary pixel PXa and the first transmission area TA1. The auxiliary pixel area PA1 and the first transmission area TA1 are alternately arranged in a first direction DR1 and a second direction DR2, for example, as a grating.

The auxiliary pixel area PA1 may include an auxiliary pixel Pr emitting red light, an auxiliary pixel Pg emitting green light, and an auxiliary pixel Pb emitting blue light. FIG. 4 shows a pentile-type auxiliary pixel PXa, but the auxiliary pixel PXa may have various shapes, e.g., a stripe shape, etc. Also, in FIG. 4, eight auxiliary pixels PXa are in the auxiliary pixel area PA1, but the number of auxiliary pixel PXa may vary depending on the resolution of the first display area DA1.

According to some example embodiments, one main pixel PXm, one connecting pixel PXc, and one auxiliary pixel PXa may include the same pixel circuits from one another. However, one or more embodiments are not limited thereto. The pixel circuit in the main pixel PXm, the pixel circuit in the connecting pixel PXc, and the pixel circuit in the auxiliary pixel PXa may be different from one another.

The first transmission area TA1 may not include the auxiliary pixel PXa. Not including the auxiliary pixel PXa may denote that the auxiliary pixel PXa does not include a display element such as an organic light-emitting diode OLED. That is, it may be understood that the first transmission area TA1 does not include a pixel electrode, an intermediate layer, and an opposite electrode of the organic light-emitting diode OLED, and a pixel circuit electrically connected to the organic light-emitting diode OLED. Some of signal lines PL, DL, SL, and EL connected to supply signals to the auxiliary pixels PXa in the auxiliary pixel area PA1 may pass through the first transmission area TA1. However, even in this case, the signal lines PL, DL, SL, and EL may arch around a center of the first transmission area TA1 in order to increase the light transmittance of the first transmission area TA1.

According to some example embodiments, a conductive layer may be on the substrate 100, corresponding to the auxiliary pixel area PA1 of the first display area DA1. The conductive layer may be under the auxiliary pixels PXa, for example, may be between a thin film transistor of the auxiliary pixel PXa and the substrate 100. The conductive layer may prevent or reduce instances of external light emitted from the component 20 being incident to the pixel circuit (PC, see, e.g., FIG. 5) of the auxiliary pixel PXa and from affecting the auxiliary pixel PXa. A constant voltage or a signal is applied to the conductive layer to prevent damage to the pixel circuit PC due to an electrostatic discharge. There may be a plurality of conductive layers in the first display area DA1, and if necessary, the conductive layers may receive different voltages from one another.

A second transmission area TA2 and a third transmission area TA3 may be similar to the first transmission area TA1. That is, the second and third transmission areas TA2 and TA3 may not include the connecting pixels PXc. Here, not including the connecting pixel PXc is similar to the above description about not including the auxiliary pixel PXa, and thus, detailed descriptions thereof are omitted here.

Referring back to FIG. 3, each of the main, connecting, and auxiliary pixels PXm, PXc, and PXa may be electrically connected to peripheral circuits in the non-display area NDA. In the non-display area NDA, a first scan driving circuit 110, a second scan driving circuit 120, a terminal 140, a data driving circuit 150, a first power supply line 160, and a second power supply line 170 may be arranged.

The first scan driving circuit 110 may provide each of the main, connecting, and auxiliary pixels PXm, PXc, or PXa with a scan signal via a scan line SL. The first scan driving circuit 110 may provide each of the main, connecting, and auxiliary pixels PXm, PXc, or PXa with an emission control signal via an emission control line EL. The second scan driving circuit 120 may be arranged in parallel with the first scan driving circuit 110, as the display area DA is arranged therebetween. Some of the main, connecting, and auxiliary pixels PXm, PXc, and PXa arranged in the display area DA may be electrically connected to the first scan driving circuit 110, and the other pixels may be connected to the second scan driving circuit 120. According to some example embodiments, the second scan driving circuit 120 may be omitted.

The terminal 140 may be arranged at a side of the substrate 100. The terminal 140 may not be covered by an insulating layer but is exposed, and may be electrically connected to a printed circuit board PCB. A terminal PCB-P of the printed circuit board PCB may be electrically connected to the terminal 140 of the display panel 10. The printed circuit board PCB may transfer a signal or a power from a controller to the display panel 10. A control signal generated by the controller may be respectively transferred to the first and second scan driving circuits 110 and 120 via the printed circuit board PCB. The controller may provide the first and second power supply lines 160 and 170 respectively with a first power and a second power voltages ELVDD and ELVSS (see FIGS. 5 and 6) via first and second connecting lines 161 and 171. The first power voltage ELVDD is supplied to each of the main, connecting and auxiliary pixels PXm PXc or PXa via a driving voltage line PL connected to the first power supply line 160, and the second power voltage ELVSS may be provided to an opposite electrode of each pixel PXm or PXa connected to the second power supply line 170.

The data driving circuit 150 is electrically connected to a data line DL. A data signal of the data driving circuit 150 may be provided to each of the the main, connecting and auxiliary pixels PXm PXc or PXa via a connecting line 151 connected to the terminal 140 and the data line DL connected to the connecting line 151. Although FIG. 3 shows that the data driving circuit 150 is arranged on the printed circuit board PCB, the data driving circuit 150 may be arranged on the substrate 100, according to some example embodiments. For example, the data driving circuit 150 may be between the terminal 140 and the first power supply line 160.

The first power supply line 160 may include a first sub-line 162 and a second sub-line 163 that extend in parallel with each other in an X-direction with the display area DA interposed therebetween. The second power supply line 170 has a loop shape having an opening side to partially surround the display area DA.

Figure 5:
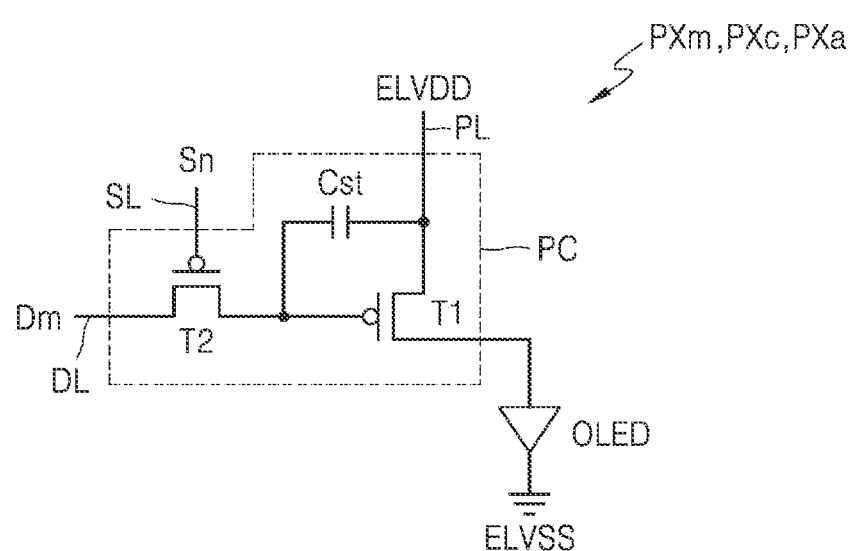
FIGS. 5 and 6 are equivalent circuit diagrams of a pixel in a display panel according to some example embodiments.
Figure 6:
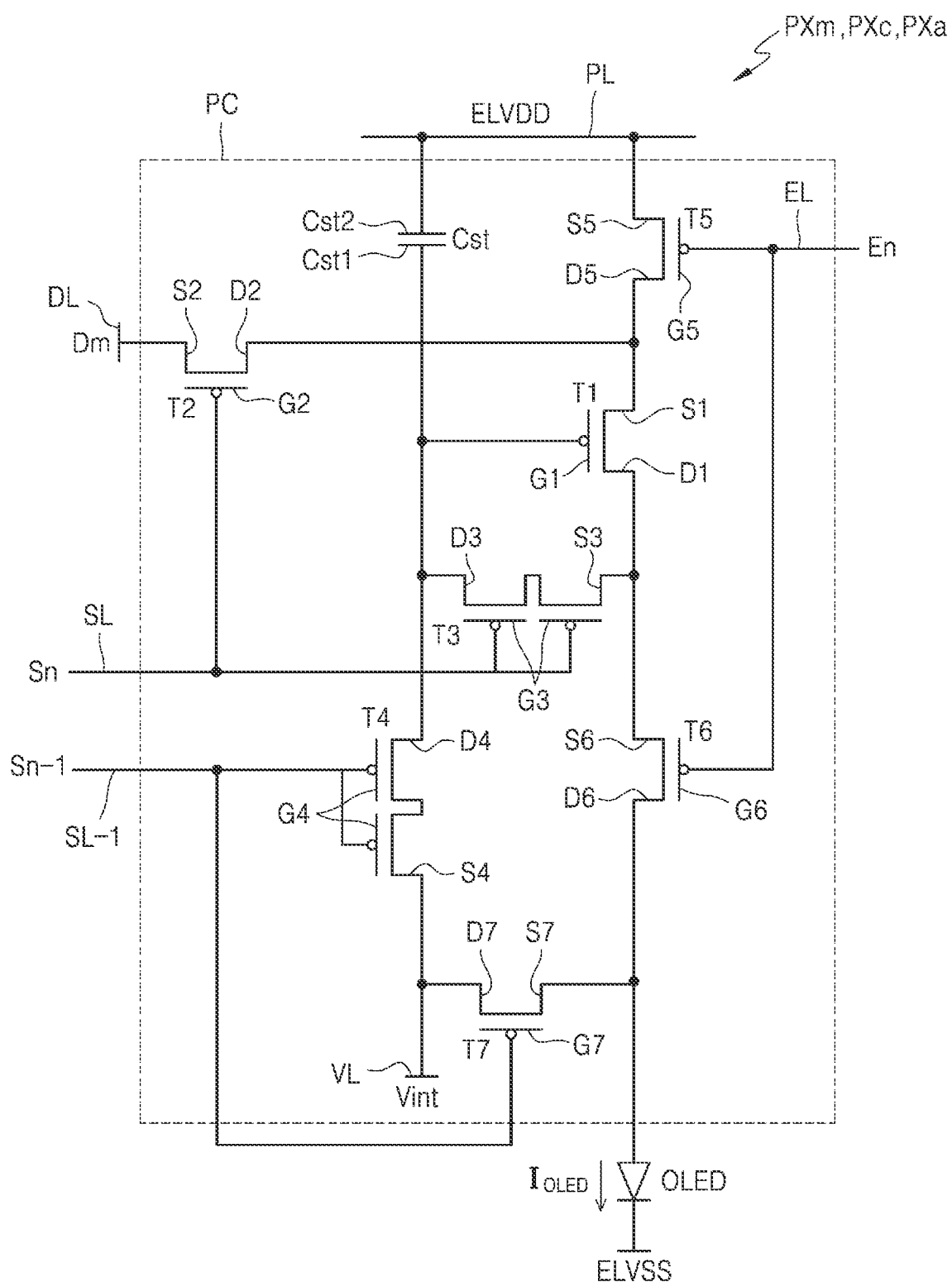

FIGS. 5 and 6 are equivalent circuit diagrams of a pixel in the display panel according to some example embodiments.

Referring to FIGS. 5 and 6, each of the main, connecting, and auxiliary pixels PXm, PXc, and PXa includes a pixel circuit PC connected to the scan line SL and the data line DL and an organic light-emitting diode OLED connected to the pixel circuit PC.

The pixel circuit PC includes a driving thin film transistor (TFT) T1, a switching TFT T2, and a storage capacitor Cst. The switching TFT T2 is connected to the scan line SL and the data line DL and transfers a data signal Dm input through the data line DL to the driving TFT T1 according to a scan signal Sn input through the scan line SL.

The storage capacitor Cst is connected to the switching TFT T2 and a driving voltage line PL and stores a voltage corresponding to a difference between a voltage transferred from the switching TFT T2 and a first power voltage ELVDD (or a driving voltage) supplied to the driving voltage line PL.

The driving TFT T1 is connected to the driving voltage line PL and the storage capacitor Cst and may control a driving current flowing from the driving voltage line PL to the organic light-emitting diode OLED in response to the voltage value stored in the storage capacitor Cst. The organic light-emitting diode OLED may emit light having a luminance (e.g., a set or predetermined luminance) according to the driving current.

FIG. 5 shows an example in which the pixel circuit PC includes two TFTs and one storage capacitor, but one or more embodiments are not limited thereto. As shown in FIG. 6, the pixel circuit PC may include seven TFTs and one storage capacitor. In FIG. 6, the pixel circuit PC includes one storage capacitor, but the pixel circuit PC may include two or more storage capacitors.

Referring to FIG. 6, each of the main, connecting, and auxiliary pixels PXm, PXc, and PXa includes a pixel circuit PC and an organic light-emitting diode OLED connected to the pixel circuit PC. The pixel circuit PC may include a plurality of TFTs and a storage capacitor. The TFTs and the storage capacitor may be connected to signal lines SL, SL-1, EL, and DL, an initialization voltage line VL, and a driving voltage line PL.

In FIG. 6, each of the main, connecting, and auxiliary pixels PXm, PXc, and PXa is connected to the signal lines SL, SL-1, EL, and DL, the initialization voltage line VL, and the driving voltage line PL, but one or more embodiments are not limited thereto. According to some example embodiments, at least one of the signal lines SL, SL-1, EL, and DL, the initialization voltage line VL, or the driving voltage line PL may be shared by neighboring pixels.

The signal lines include the scan line SL transferring a scan signal Sn, a previous scan line SL-1 transferring a previous scan signal Sn-1 to the first initialization TFT T4 and the second initialization TFT T7, an emission control line EL transferring an emission control signal En to the operation control TFT T5 and the emission control TFT T6, and a data line DL intersecting with the scan line SL and transferring a data signal Dm. The driving voltage line PL transfers the driving voltage ELVDD to the driving TFT T1, and the initialization voltage line VL transfers an initialization voltage Vint for initializing the driving TFT T1 and the pixel electrode.

A driving gate electrode GE1 of the driving TFT T1 is connected to a lower electrode CE1 of the storage capacitor Cst, a driving source electrode S1 of the driving TFT T1 is connected to the driving voltage line PL via the operation control TFT T5, and a driving drain electrode D1 of the driving TFT T1 is electrically connected to a pixel electrode of a organic light-emitting diode OLED via the emission control TFT T6. The driving TFT T1 receives the data signal Dm according to a switching operation of the switching TFT T2 to supply a driving current IOLED to the main organic light-emitting diode OLED.

A switching gate electrode GE2 of the switching TFT T2 is connected to the scan line SL, a switching source electrode S2 of the switching TFT T2 is connected to the data line DL, a switching drain electrode D2 of the switching TFT T2 is connected to the driving source electrode S1 of the driving TFT T1 and at the same time, is connected to the driving voltage line PL via the operation control TFT T5. The switching TFT T2 is turned on according to the scan signal Sn received through the scan line SL and performs a switching operation that transfers the data signal Dm transferred through the data line DL to the driving source electrode S1 of the driving TFT T1.

A compensation gate electrode G3 of the compensation TFT T3 is connected to the scan line SL, a compensation source electrode S3 of the compensation TFT T3 is connected to the driving drain electrode D1 of the driving TFT T1 and at the same time is connected to the pixel electrode of the organic light-emitting diode OLED via the emission control TFT T6, and a compensation drain electrode D3 of the compensation TFT T3 is connected to the lower electrode CE1 of the storage capacitor Cst, a first initialization drain electrode D4 of the first initialization TFT T4, and the driving gate electrode G1 of the driving TFT T1. The compensation TFT T3 is turned on according to the scan signal Sn received through the scan line SL to electrically connect the driving gate electrode G1 and the driving drain electrode D1 of the driving TFT T1 to each other and to diode-connect the driving TFT T1.

A first initialization gate electrode G4 of the first initialization TFT T4 is connected to the previous scan line SL-1, a first initialization source electrode S4 of the first initialization TFT T4 is connected to a second initialization drain electrode D7 of the second initialization TFT T7 and the initialization voltage line VL, and the first initialization drain electrode D4 of the first initialization TFT T4 is connected to the lower electrode CE1 of the storage capacitor Cst, the compensation drain electrode D3 of the compensation TFT T3, and the driving gate electrode GE1 of the driving TFT T1. The first initialization TFT T4 is turned on according to a previous scan signal Sn-1 transferred through the previous scan line SL-1 to transfer the initialization voltage Vint to the driving gate electrode G1 of the driving TFT T1 and perform an initialization operation for initializing a voltage at the driving gate electrode G1 of the driving TFT T1.

An operation control gate electrode G5 of the operation control TFT T5 is connected to the emission control line EL, an operation control source electrode S5 of the operation control TFT T5 is connected to the driving voltage line PL, and an operation control drain electrode D5 of the operation control TFT T5 is connected to the driving source electrode S1 of the driving TFT T1 and the switching drain electrode D2 of the switching TFT T2.

An emission control gate electrode G6 of the emission control TFT T6 is connected to the emission control line EL, an emission control source electrode S6 of the emission control TFT T6 is connected to the driving drain electrode D1 of the driving TFT T1 and the compensation source electrode S3 of the compensation TFT T3, and an emission control drain electrode D6 of the emission control TFT T6 is electrically connected to a second initialization source electrode S7 of the second initialization TFT T7 and the pixel electrode of the organic light-emitting diode OLED.

The operation control TFT T5 and the emission control TFT T6 are simultaneously turned on according to the emission control signal En transferred through the emission control line EL to transfer the driving voltage ELVDD to the organic light-emitting diode OLED and to allow a driving current IOLED to flow in the organic light-emitting diode OLED.

The second initialization gate electrode G7 of the second initialization TFT T7 is connected to the previous scan line SL-1, a second initialization source electrode S7 of the second initialization TFT T7 is connected to the emission control drain electrode D6 of the emission control TFT T6 and the pixel electrode of the organic light-emitting diode OLED, and a second initialization drain electrode D7 of the second initialization TFT T7 is connected to the first initialization source electrode S4 of the first initialization TFT T4 and the initialization voltage line VL. The second initialization TFT T7 is turned on according to the previous scan signal Sn-1 transferred through the previous scan line SL-1 to initialize the pixel electrode of the organic light-emitting diode OLED.

FIG. 6 shows a case in which the first initialization thin film transistor T4 and the second initialization thin film transistor T7 are connected to the previous scan line SL-1, but one or more embodiments are not limited thereto. According to some example embodiments, the first initialization TFT T4 may be connected to the previous scan line SL-1 to operate according to the previous scan signal Sn-1, and the second initialization TFT T7 may be connected to a separate signal line (e.g., a post scan line) to operate according to a signal transferred to the signal line.

An upper electrode CE2 of the storage capacitor Cst is connected to the driving voltage line PL, and an opposite electrode of the organic light-emitting diode OLED is connected to the common voltage ELVSS. Accordingly, the organic light-emitting diode OLED emits light by receiving the driving current IOLED from the driving TFT T1 to display images.

In FIG. 6, the compensation TFT T3 and the first initialization TFT T4 have dual-gate electrodes, but the compensation TFT T3 and the first initialization TFT T4 may each have one gate electrode.

Figure 7:
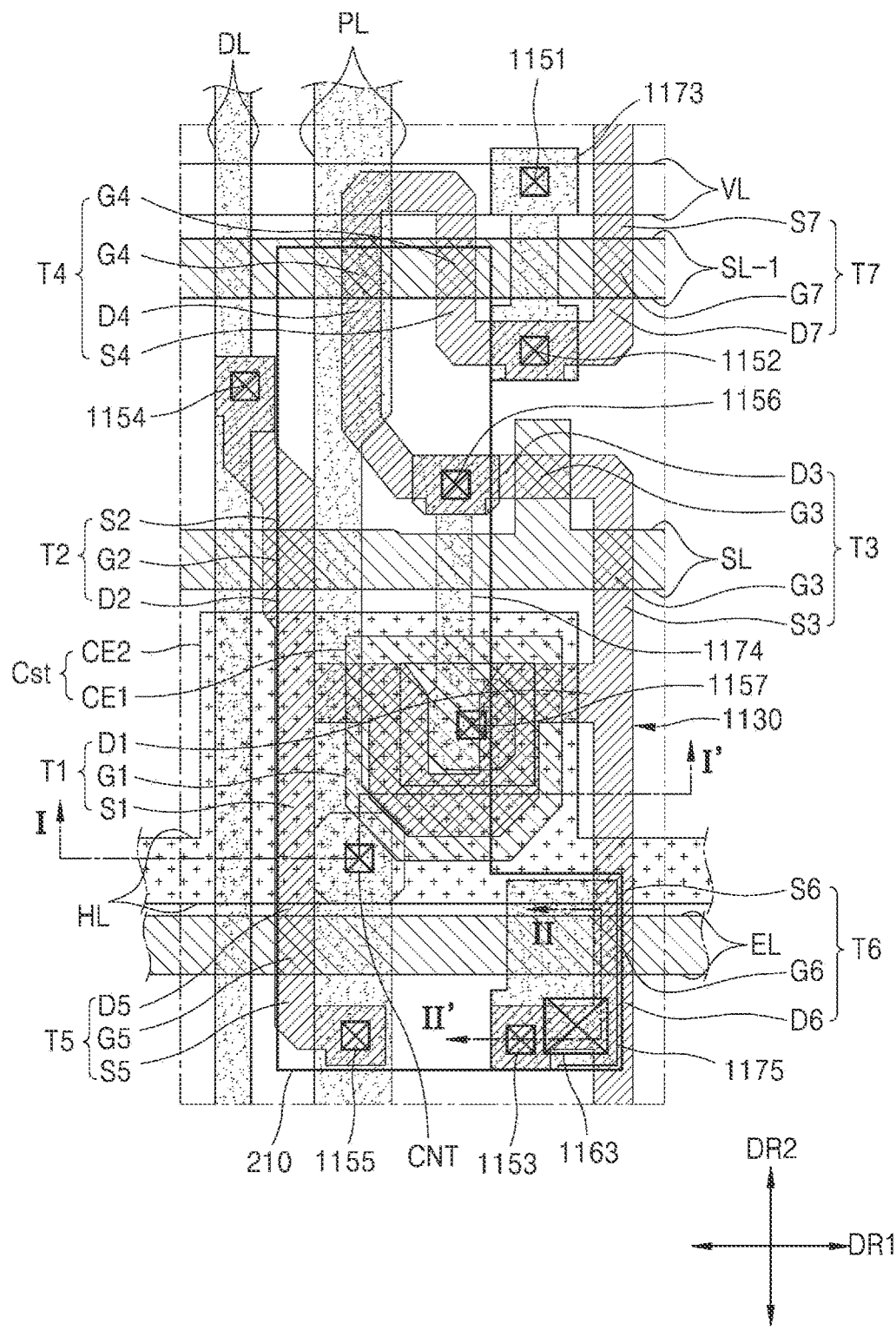
FIG. 7 is a diagram of a pixel circuit in a pixel according to some example embodiments.
Figure 8:
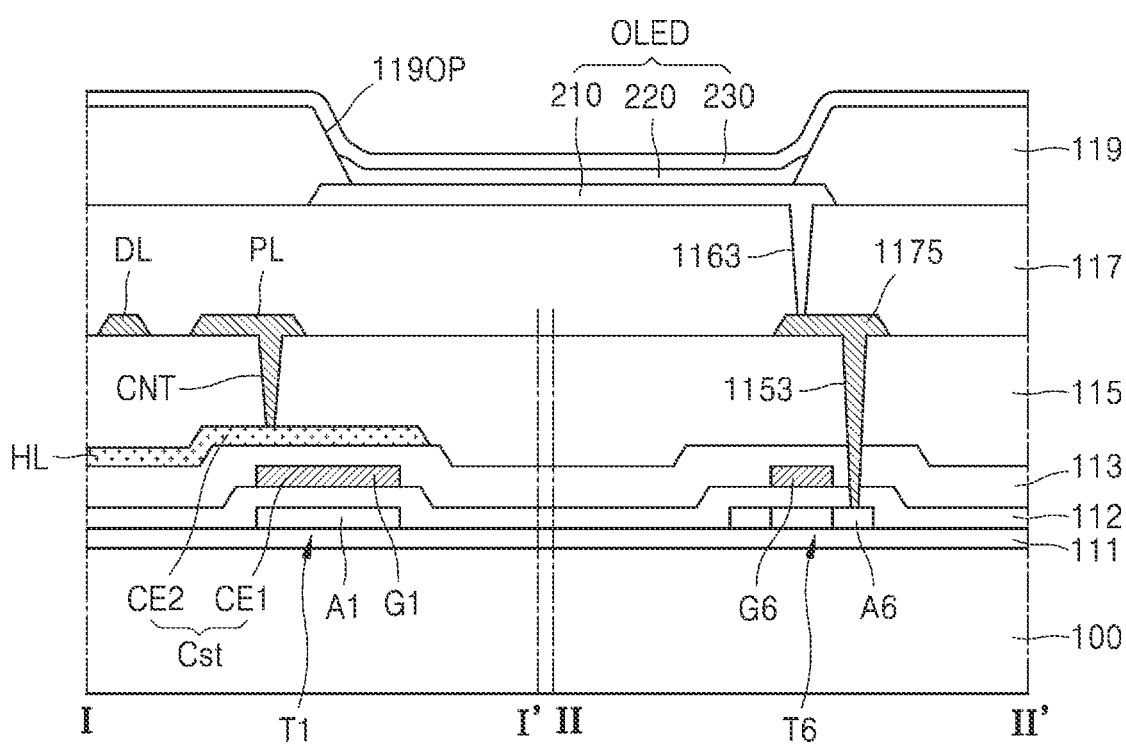
FIG. 8 is a cross-sectional view taken along the line I-I' and the line II-II' of FIG. 7.

FIG. 7 is a diagram of a pixel circuit in a pixel according to some example embodiments. FIG. 8 is a cross-sectional view taken along the line I-I' and the line II-II' of FIG. 7.

Referring to FIGS. 7 and 8, the driving TFT T1, the switching TFT T2, the compensation TFT T3, the first initialization TFT T4, the operation control TFT T5, the emission control TFT T6, and the second initialization TFT T7 are arranged along a semiconductor layer 1130.

The semiconductor layer 1130 is arranged on a substrate, on which a buffer layer including an inorganic insulating material is arranged. According to some example embodiments, the semiconductor layer 1130 may include low temperature polysilicon (LTPS). Because a polysilicon material has high electron mobility (100 cm²/Vs or greater), the polysilicon material may be used as a semiconductor layer of a TFT in a display apparatus owing to its low energy consumption and excellent reliability. However, one or more embodiments are not limited thereto, that is, according to some example embodiments, the semiconductor layer 1130 may include amorphous silicon (a-Si) and/or oxide semiconductor. Alternatively, semiconductor layers in some of the plurality of TFTs may include LTPS and semiconductor layers in some other TFTs may include a-Si and/or oxide semiconductor.

Some regions in the semiconductor layer 1130 correspond to semiconductor layers of the driving TFT T1, the switching TFT T2, the compensation TFT T3, the first initialization TFT T4, the operation control TFT T5, the emission control TFT T6, and the second initialization TFT T7. In other words, the semiconductor layers of the driving TFT T1, the switching TFT T2, the compensation TFT T3, the first initialization TFT T4, the operation control TFT T5, the emission control TFT T6, and the second initialization TFT T7 are connected to one another and curved in various shapes.

The semiconductor layer 1130 includes a channel region, and a source region and a drain region at opposite sides of the channel region, and the source region and the drain region may be appreciated respectively as a source electrode and a drain electrode of a corresponding TFT. Hereinafter, the source region and the drain region will be referred to as a source electrode and a drain electrode, for convenience of description.

The driving TFT T1 includes the driving gate electrode G1 overlapping a driving channel region, and the driving source electrode S1 and the driving drain electrode D1 at opposite sides of the driving channel region. The driving channel region overlapping the driving gate electrode G1 has a bent shape, e.g., an omega shape, to establish a long channel length within a narrow space. When the driving channel region has a long length, a driving range of a gate voltage increases, and thus, a gray level of light emitted from the organic light-emitting diode OLED may be finely controlled and quality of displaying image may be improved.

The switching TFT T2 includes the switching gate electrode G2 overlapping a switching channel region, and the switching source electrode S2 and the switching drain electrode D2 at opposite sides of the switching channel region. The switching drain electrode D2 may be connected to the driving source electrode S1.

The compensation TFT T3 is a dual-TFT including compensation gate electrodes S3 respectively overlapping two compensation channel regions, and a compensation source electrode S3 and the compensation drain electrode D3 at opposite sides of two compensation channel region. The compensation TFT T3 may be connected to the driving gate electrode G1 of the driving TFT T1 via a node connecting line 1174 that will be described later.

The first initialization TFT T4 is a dual-TFT including first initialization gate electrodes G4 respectively overlapping two first initialization channel regions, and the first initialization source electrode S4 and the first initialization drain electrode D4 at opposite sides of two first initialization channel regions.

The operation control TFT T5 may include the operation control gate electrode G5 overlapping an operation control channel region, and the operation control source electrode S5 and the operation control drain electrode D5 at opposite sides of the operation control gate electrode G5. The operation control drain electrode D5 may be connected to the driving source electrode S1.

The emission control TFT T6 may include the emission control gate electrode G6 overlapping an emission control channel region, and the emission control source electrode S6 and the emission control drain electrode D6 at opposite sides of the emission control gate electrode G6. The emission control source electrode S6 may be connected to the driving drain electrode D1.

The second initialization TFT T7 may include the second initialization gate electrode G7 overlapping a second initialization channel region, and the second initialization source electrode S7 and the second initialization drain electrode D7 at opposite sides of the second initialization gate electrode G7.

The above TFTs may be connected to the signal lines SL, SL-1, EL, and DL, the initialization voltage line VL, and the driving voltage line PL.

The scan line SL, the previous scan line SL-1, the emission control line EL, and the driving gate electrode G1 may be arranged on the semiconductor layer 1130 as insulating layer(s) provided therebetween.

The scan line SL may extend in the first direction DR1. Some regions in the scan line SL may correspond to the switching and compensation gate electrodes G2 and G3. For example, regions of the scan line SL, which overlap the channel regions of the switching and compensation TFTs T2 and T3, may be respectively the switching and compensation gate electrodes G2 and G3.

The previous scan line SL-1 extends along the first direction DR1, and some regions of the previous scan line SL-1 may correspond to the first and second initialization gate electrodes G4 and G7. For example, regions in the previous scan line SL-1 overlapping the channel regions of the first and second initialization driving TFTs T4 and T7 may be the first and second initialization gate electrodes G4 and G7, respectively.

The emission control line EL extends along the first direction DR1. Some regions in the emission control line EL may correspond to the operation control and emission control gate electrodes G5 and G6. For example, regions in the emission control line EL overlapping the channel regions of the operation control and emission control TFTs T5 and T6 may be the operation control and emission control gate electrodes G5 and G6, respectively.

The driving gate electrode G1 is a floating electrode that may be connected to the compensation TFT T3 via the node connecting line 1174.

An electrode voltage line HL may be arranged on the scan line SL, the previous scan line SL-1, the emission control line EL, and the driving gate electrode G1 as insulating layer(s) provided therebetween.

The electrode voltage line HL may extend in the first direction DR1 to intersect with the data line DL and the driving voltage line PL. A part of the electrode voltage line HL covers at least a part of the driving gate electrode G1, and may configure the storage capacitor Cst with the driving gate electrode G1. For example, the driving gate electrode G1 may become the lower electrode CE1 of the storage capacitor Cst, and a part of the electrode voltage line HL may become the upper electrode CE2 of the storage capacitor Cst.

The upper electrode CE2 of the storage capacitor Cst is electrically connected to the driving voltage line PL. Regarding to this, the electrode voltage line HL may be connected to the driving voltage line PL on the electrode voltage line HL via a contact hole CNT. Therefore, the electrode voltage line HL may have the same voltage level (constant voltage) as the driving voltage line PL. For example, the electrode voltage line HL may have a constant voltage of +5V. The electrode voltage line HL may be appreciated as the driving voltage line in a transverse direction.

The driving voltage line PL extends along the second direction DR2, and the electrode voltage line HL electrically connected to the driving voltage line PL extends along the first direction DR1 intersecting with the second direction DR2. Thus, the plurality of driving voltage lines PL and electrode voltage lines HL in the display area may generate a mesh structure.

The data line DL, the driving voltage line PL, an initialization connecting line 1173, and the node connecting line 1174 may be arranged on the electrode voltage line HL as insulating layer(s) provided therebetween.

The data line DL extends in the second direction DR2, and may be connected to the switching source electrode S2 of the switching TFT T2 via a contact hole 1154. A part of the data line DL may be appreciated as the switching source electrode.

The driving voltage line PL extends in the second direction DR2, and as described above, is connected to the electrode voltage line HL via the contact hole CNT. Also, the driving voltage line PL may be connected to the operation control TFT T5 via a contact hole 1155. The driving voltage line PL may be connected to the operation control drain electrode D5 via the contact hole 1155.

An end of the initialization connecting line 1173 is connected to the first and second initialization TFTs T4 and T7 via a contact hole 1152, and the other end of the initialization connecting line 1173 may be connected to the initialization voltage line VL that will be described later via a contact hole 1151.

An end of the node connecting line 1174 may be connected to the compensation drain electrode D3 via a contact hole 1156, and the other end of the node connecting line 1174 may be connected to the driving gate electrode G1 via a contact hole 1157.

The initialization voltage line VL may be arranged on the data line DL, the driving voltage line PL, the initialization connecting line 1173, and the node connecting line 1174 as insulating layer(s) provided therebetween.

The initialization voltage line VL extends in the first direction DR1. The initialization voltage line VL may be connected to the first and second initialization TFTs T4 and T7 via the initialization connecting line 1173. The initialization voltage line VL may have a constant voltage (e.g., $-2V$, etc.).

The initialization voltage line VL is arranged at the same layer as that of a pixel electrode 210 of the organic light-emitting diode OLED (see FIG. 8), and may include the same material as that of the pixel electrode. The pixel electrode 210 may be connected to the emission control TFT T6. The pixel electrode 210 is connected to a connection metal 1175 via a contact hole 1163, and the connection metal 1175 may be connected to the emission control drain electrode D6 via the contact hole 1153.

In FIG. 7, the initialization voltage line VL is arranged at the same layer as that of the pixel electrode 210, but according to some example embodiments, the initialization voltage line VL may be arranged at the same layer as the electrode voltage line HL.

Hereinafter, a stack structure of the components included in the display panel according to some example embodiments will be described with reference to FIG. 8.

The substrate 100 may include glass or a polymer resin. The polymer resin may include polyethersulfone, polyacrylate, polyetherimide, polyethylene n naphthalate, polyethylene terephthalate, polyphenylene sulfide, polyarylate, polyimide, polycarbonate, cellulose acetate propionate, etc. The substrate 100 including the polymer resin may be flexible, rollable, or bendable. The substrate 100 may have a multi-layered structure including a layer including the polymer resin and an inorganic layer.

A buffer layer 111 is located on the substrate 100 to reduce or block infiltration of impurities, moisture, or external air from a lower portion of the substrate 100, and to provide a flat surface on the substrate 100. The buffer layer 111 may include an inorganic material such as an oxide material or a nitride material, an organic material, or an inorganic-organic composite material, and may have a single-layered or multi-layered structure including the inorganic material and the organic material. A barrier layer for preventing or reducing instances of infiltration of external air may be further provided between the substrate 100 and the buffer layer 111.

The gate electrodes G1 and G6 are arranged respectively on the semiconductor layers A1 and A6 with a first gate insulating layer 112 arranged therebetween. The gate electrodes G1 and G6 may each include molybdenum (Mo), aluminum (Al), copper (Cu), titanium (Ti), etc., and may have a single-layered or multi-layered structure. As an example, the gate electrode G1 and G6 may each have a single layer including Mo. The scan line SL (see FIG. 7), the previous scan line SL-1, and the emission control line EL may be provided at the same layer as those of the gate electrodes G1 and G6. That is, the gate electrodes G1 and G6, the scan line SL (see FIG. 7), the previous scan line SL-1, and the emission control line EL may be arranged on the first gate insulating layer 112.

The first gate insulating layer 112 may include an insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_2$).

A second gate insulating layer 113 may be provided to cover the gate electrodes G1 and G6. The second gate insulating layer 113 may include an insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_2$).

The lower electrode CE1 of the storage capacitor Cst may be integrally provided with the gate electrode G1 of the driving TFT T1. For example, the gate electrode G1 of the driving TFT T1 may function as the lower electrode CE1 of the storage capacitor Cst.

The upper electrode CE2 of the storage capacitor Cst overlaps the lower electrode CE1 with the second gate insulating layer 113 therebetween. In this case, the second gate insulating layer 113 may function as a dielectric layer of the storage capacitor Cst. The upper electrode CE2 may include a conductive material including Mo, Al, Cu, Ti, etc., and may have a single-layered or multi-layered structure. As an example, the upper electrode CE2 may have a single layer including Mo or a multi-layered structure including Mo/Al/Mo.

In the drawings, the storage capacitor Cst is shown to overlap the driving TFT T1, but one or more embodiments of the disclosure are not limited thereto. The storage capacitor Cst may be variously modified, for example, the storage capacitor Cst may be arranged so as not to overlap the driving TFT T1.

The upper electrode CE2 may function as the electrode voltage line HL. For example, a part of the electrode voltage line HL may function as the upper electrode CE2 of the storage capacitor Cst.

An interlayer insulating layer 115 may be provided to cover the upper electrode CE2. The interlayer insulating layer 115 may include an insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_2$). In FIG. 8, the interlayer insulating layer 115 has a single-layered structure, but according to some example embodiments, the interlayer insulating layer 115 may have a multi-layered structure.

The data line DL, the driving voltage line PL, and the connection metal 1175 may be arranged on the interlayer insulating layer 115. The data line DL, the driving voltage line PL, and the connection metal 1175 may include a conductive material including Mo, Al, Cu, Ti, etc., and may have a single-layered or multi-layered structure including the above materials. For example, each of the data line DL, the driving voltage line PL, and the connection metal 1175 may have a multi-layered structure including Ti/Al/Ti.

The upper electrode CE2 of the storage capacitor Cst may be connected to the driving voltage line PL via the contact hole CNT defined in the interlayer insulating layer 115. This denotes that the electrode voltage line HL is connected to the driving voltage line PL via the contact hole CNT. Therefore, the electrode voltage line HL may have the same voltage level (constant voltage) as the driving voltage line PL.

The connection metal 1175 is connected to the semiconductor layer A6 of the emission control TFT T6 via the contact hole 1153 that penetrates through the interlayer insulating layer 115, the second gate insulating layer 113, and the first gate insulating layer 112. The emission control TFT T6 may be electrically connected to the pixel electrode 210 of the organic light-emitting diode OLED via the connection metal 1175.

A planarization layer 117 is located on the data line DL, the driving voltage line PL, and the connection metal 1175, and the organic light-emitting diode OLED may be located on the planarization layer 117.

The planarization layer 117 may have a flat upper surface to make the pixel electrode 210 flat. The planarization layer 117 may include a single-layered or multi-layered structure including an organic material. The planarization layer 117 may include a general universal polymer (benzocyclobutene (BCB), polyimide, hexamethyldisiloxane (HMDSO), polymethylmethacrylate (PMMA), or polystyrene (PS)), polymer derivatives having phenol groups, acryl-based polymer, imide-based polymer, aryl ether-based polymer, amide-based polymer, fluoride-based polymer, p-xylene-based polymer, vinyl alcohol-based polymer, and blends thereof. The planarization layer 117 may include an inorganic material. The planarization layer 117 may include an insulating material such as silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), and zinc oxide ($ZnO_2$). When the planarization layer 117 includes the inorganic material, a chemical planarization polishing may be performed if necessary. Alternatively, the planarization layer 117 may include both an organic material and an inorganic material.

The pixel electrode 210 may be a (semi-) transmissive electrode or a reflective electrode. In some embodiments, the pixel electrode 210 may include a reflective layer including argentum (Ag), magnesium (Mg), Al, platinum (Pt), palladium (Pd), *aurum* (Au), nickel (Ni), neodymium (Nd), iridium (Ir), chromium (Cr), and a compound thereof, and a transparent or semi-transparent electrode layer on the reflective layer. The transparent or semi-transparent electrode layer may include at least one electrode material selected from the group consisting of indium tin oxide (ITO), indium zinc oxide (IZO), zinc oxide (ZnO), indium oxide ($In_2O_3$), indium gallium oxide, and aluminum zinc oxide (AZO). In some embodiments, the pixel electrode 210 may include a stack structure including ITO/Ag/ITO.

A pixel defining layer 119 may be located on the planarization layer 117, and the pixel defining layer 119 includes an opening 1190P exposing a center portion of the pixel electrode 210 to define a light emitting region of the pixel. Also, the pixel defining layer 119 increases a distance between an edge of the pixel electrode 210 and an opposite electrode 230 on the pixel electrode 210 to prevent generation of arc at the edge of the pixel electrode 210. The pixel defining layer 119 may include an organic insulating material such as polyimide, polyamide, an acrylic resin, BCB, HMDSO, and a phenol resin, and may be obtained by a spin coating, etc.

The intermediate layer 220 of the organic light-emitting diode OLED may include an organic light-emitting layer. The organic light-emitting layer may include an organic material including a fluorescent or phosphor material emitting red, green, blue, or white light. The organic light-emitting layer may include a low-molecular organic material or a polymer organic material, and functional layers such as a hole transport layer (HTL), a hole injection layer (HIL), an electron transport layer (ETL), and an electron injection layer (EIL) may be selectively arranged under and on the organic light-emitting layer. The intermediate layer 220 may correspond to each of the plurality of pixel electrodes 210. However, one or more embodiments are not limited thereto. The intermediate layer 220 may be variously modified, that is, may be arranged throughout the plurality of pixel electrodes 210.

The opposite electrode 230 may be a transmissive electrode or a reflective electrode. In some embodiments, the opposite electrode 230 may be a transparent or a semi-transparent electrode, and may be provided as a metal thin film including Li, Ca, LiF/Ca, LiF/Al, Al, Ag, Mg, and a compound thereof having a small work function. Also, a transparent conductive oxide (TCO) such as ITO, IZO, ZnO, or $In_2O_3$ may be further provided over the metal thin film.

When the pixel electrode 210 is a reflective electrode and the opposite electrode 230 is a transmissive electrode, light emitted from the intermediate layer 220 is emitted towards the opposite electrode 230 and the display apparatus is a top emission type. When the pixel electrode 210 is a transparent or a semi-transparent electrode and the opposite electrode 230 is a reflective electrode, the light emitted from the intermediate layer 220 is discharged towards the substrate 100 and the display apparatus may be a bottom emission type. However, one or more embodiments are not limited thereto. The display apparatus according to some example embodiments may be a dual-emission type in which light is emitted to the top and bottom surfaces.

According to some example embodiments, the opposite electrode 230 is included in the auxiliary pixels located on the first display area. However, because the first display area includes the auxiliary pixel area, in which the auxiliary pixels are located, and the first transmission area, the opposite electrode 230 may not be partially included in some region corresponding to the first transmission area. In a top-emission type display apparatus, the light may be emitted towards the opposite electrode 230, but the light transmittance may degrade to some degree due to the opposite electrode 230. Therefore, because the region corresponding to the first transmission area does not include the opposite electrode 230, the light transmittance of the first transmission area may be improved.

To this end, the opposite electrode 230 on the first display area may be patterned to correspond to each auxiliary pixel area. The opposite electrode 230 in the first display area DA1 may be formed by partially removing a region corresponding to the first transmission area by a laser lift-off process or by a fine metal mask (FMM) patterning process. Hereinafter, it will be assumed that the opposite electrode 230 is formed on the first display area by the FMM patterning.

The opposite electrode 230 may be also included in the connecting pixels in the second display area. However, because the second display area includes a connecting pixel area, in which the connecting pixels are located, a second transmission area, and a third transmission area, the opposite electrode 230 may not be included in some regions corresponding to the second transmission area and the third transmission area. In a top-emission type display apparatus, the light may be emitted towards the opposite electrode 230, but the light transmittance may degrade to some degree due to the opposite electrode 230. Therefore, the opposite electrode 230 is not provided on the regions corresponding to the second transmission area and the third transmission area, and thus the light transmittance of the second and third transmission areas and may be improved.

To this end, the opposite electrode 230 on the second display area may be patterned to correspond to each connecting pixel area. The opposite electrode 230 in the second display area may be formed by partially removing some regions corresponding to the second and third transmission areas and by a laser lift-off process or by an FMM patterning process. Hereinafter, it will be assumed that the opposite electrode 230 is formed on the second display area by the FMM patterning.

The opposite electrode 230 is provided throughout the entire surface of the third display area, and some edges may be located on the non-display area NDA. The opposite electrode 230 may be provided integrally with respect to the main pixels on the third display area, that is, a plurality of organic light-emitting diodes OLED, to correspond to the plurality of pixel electrodes 210.

Figure 9:
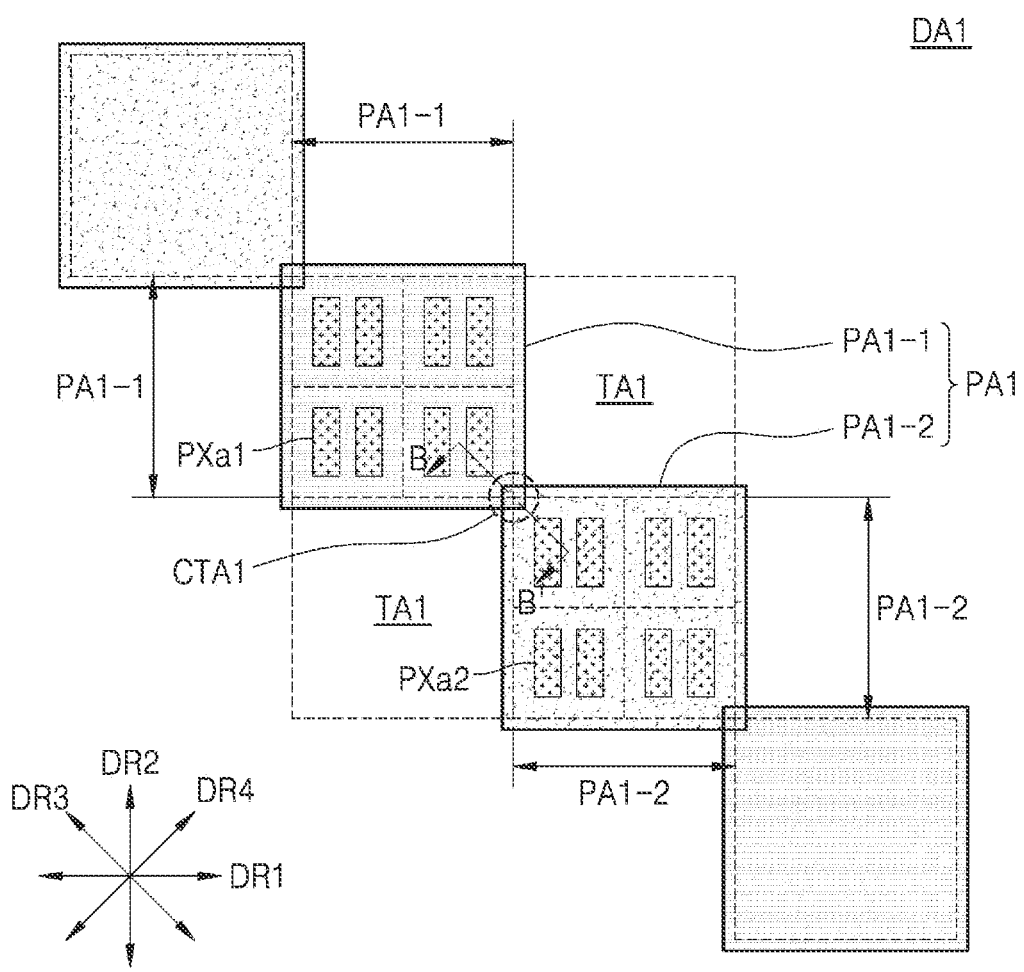
FIGS. 9 and 10 are plan views showing a part of a first display area according to some example embodiments.
Figure 10:
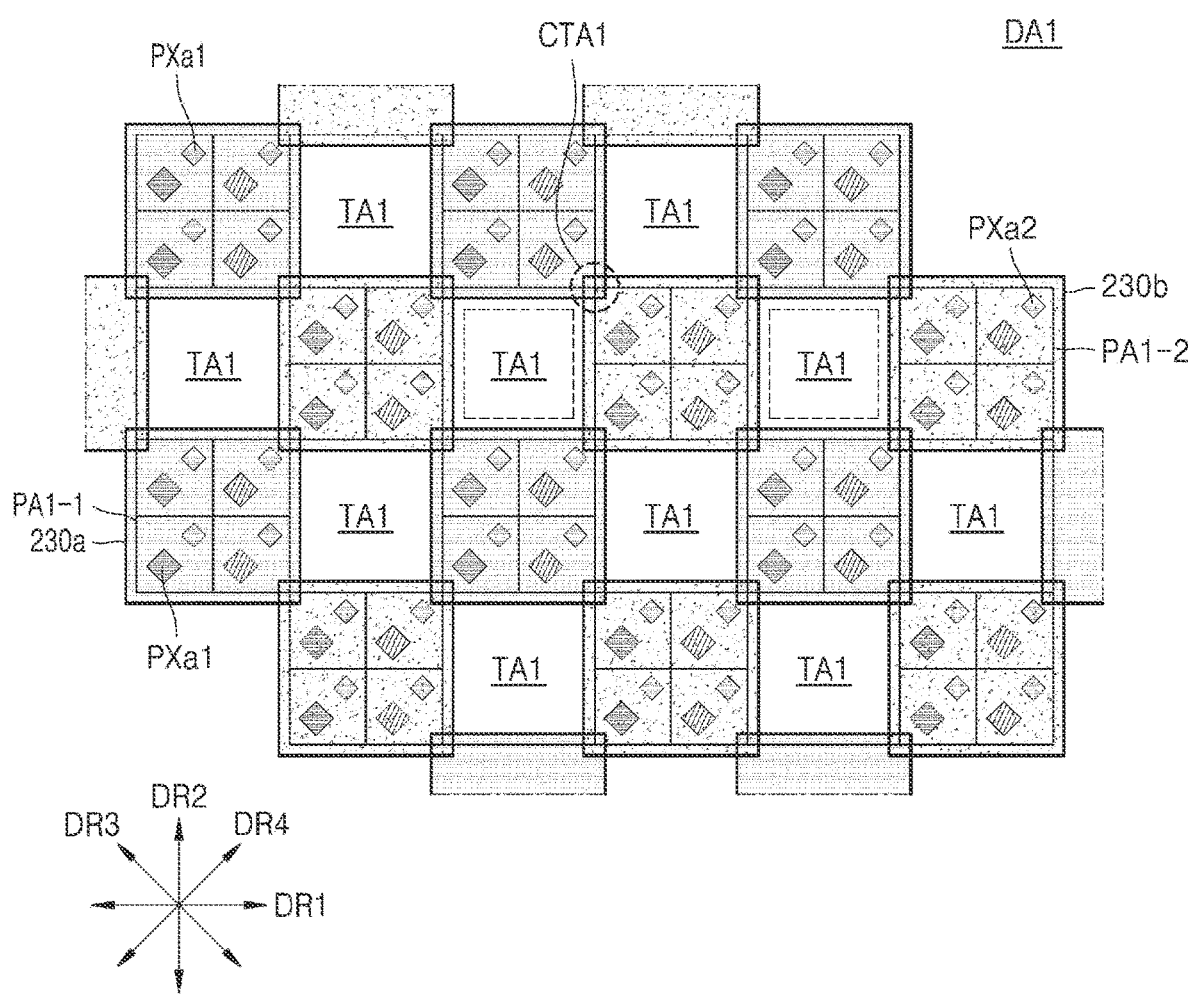

FIGS. 9 and 10 are plan views showing a part of the first display area DA1 according to some example embodiments.

Referring to FIGS. 9 and 10, as described above, the first display area DA1 includes the auxiliary pixel area PA1 and the first transmission area TA1, and the auxiliary pixels PXa are arranged in the auxiliary pixel area PA1. The auxiliary pixel area PA1 includes a first pixel area PA1-1 and a second pixel area PA1-2 as shown in FIG. 9. A plurality of first pixels PXa1 are in the first pixel area PA1-1 and a plurality of second pixels PXa2 are in the second pixel area PA1-2.

According to some example embodiments, a first opposite electrode 230a is on the first pixel area PA1-1 and a second opposite electrode 230b is on the second pixel area PA1-2. The first opposite electrode 230a may correspond to the first pixel area PA1-1 and the second opposite electrode 230b may correspond to the second pixel area PA1-2. Also, the first opposite electrode 230a and the second opposite electrode 230b may be partially in contact with each other. Here, the first opposite electrode 230a and the second opposite electrode 230b may have the same shape as each other.

Referring to FIG. 10, the plurality of first pixels PXa1 are arranged on the first pixel area PA1-1. Each of the plurality of first pixels PXa1 includes a scan line for receiving a scan signal and a data line for receiving a data signal. The scan line extends in the first direction DR1 and the data line may extend in the second direction DR2 that crosses, e.g., intersects with the first direction DR1. Here, other signal lines PL, EL, SL-1, VL (see FIG. 7) may be also provided on the first pixel area PA1-1.

The data line and the scan line may be partially located on the first transmission area TA1. In this case, the scan line, for example, may have an arched portion that arch around an edge of the first transmission area TA1 in order to improve the light transmittance of the first transmission area TA1. The arched portion may be also applied to other signal lines PL, EL, SL-1, and VL (see FIG. 7) than the scan line.

The plurality of first pixels PXa1 on the first pixel area PA1-1 may include the first opposite electrode 230a that is integrally provided with respect to one first pixel area PA1-1.

The plurality of second pixels PXa2 on the second pixel area PA1-2 may include the second opposite electrode 230b that is integrally provided with respect to one second pixel area PA1-2.

The first pixel area PA1-1 and the second pixel area PA1-2 may be arranged on different lines from each other. In this case, the first pixel area PA1-1 and the second pixel area PA1-2 may surround the first transmission area TA1. That is, the first pixel area PA1-1 and the second pixel area PA1-2 may be arranged in zigzags.

The first opposite electrode 230a and the second opposite electrode 230b may respectively correspond to the first pixel area PA1-1 and the second pixel area PA1-2, and may partially in contact with each other. There is a first contact area CTA1 where the first opposite electrode 230a and the second opposite electrode 230b are in contact with each other between the adjacent first pixel area PA1-1 and the second pixel area PA1-2, and the first and second opposite electrodes 230a and 230b may be electrically connected to each other via the first contact area CTA1.

In this case, because the first and second opposite electrodes 230a and 230b are connected to each other via the first contact area CTA1, increase in resistance of the first and second opposite electrodes 230a and 230b on the first display area DA1 may be prevented.

Figure 11:
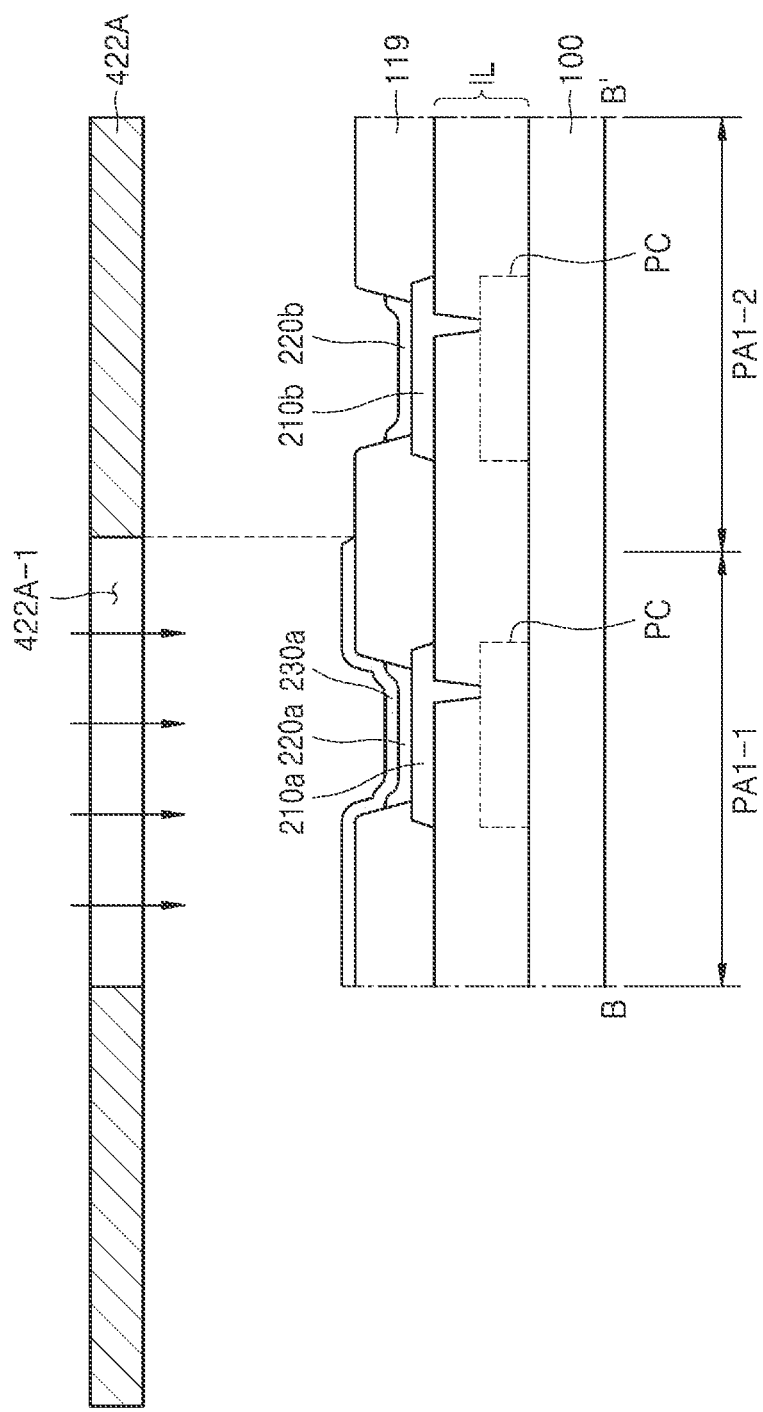
FIGS. 11 and 12 are cross-sectional views illustrating some processes of manufacturing of a display panel according to some example embodiments.
Figure 12:
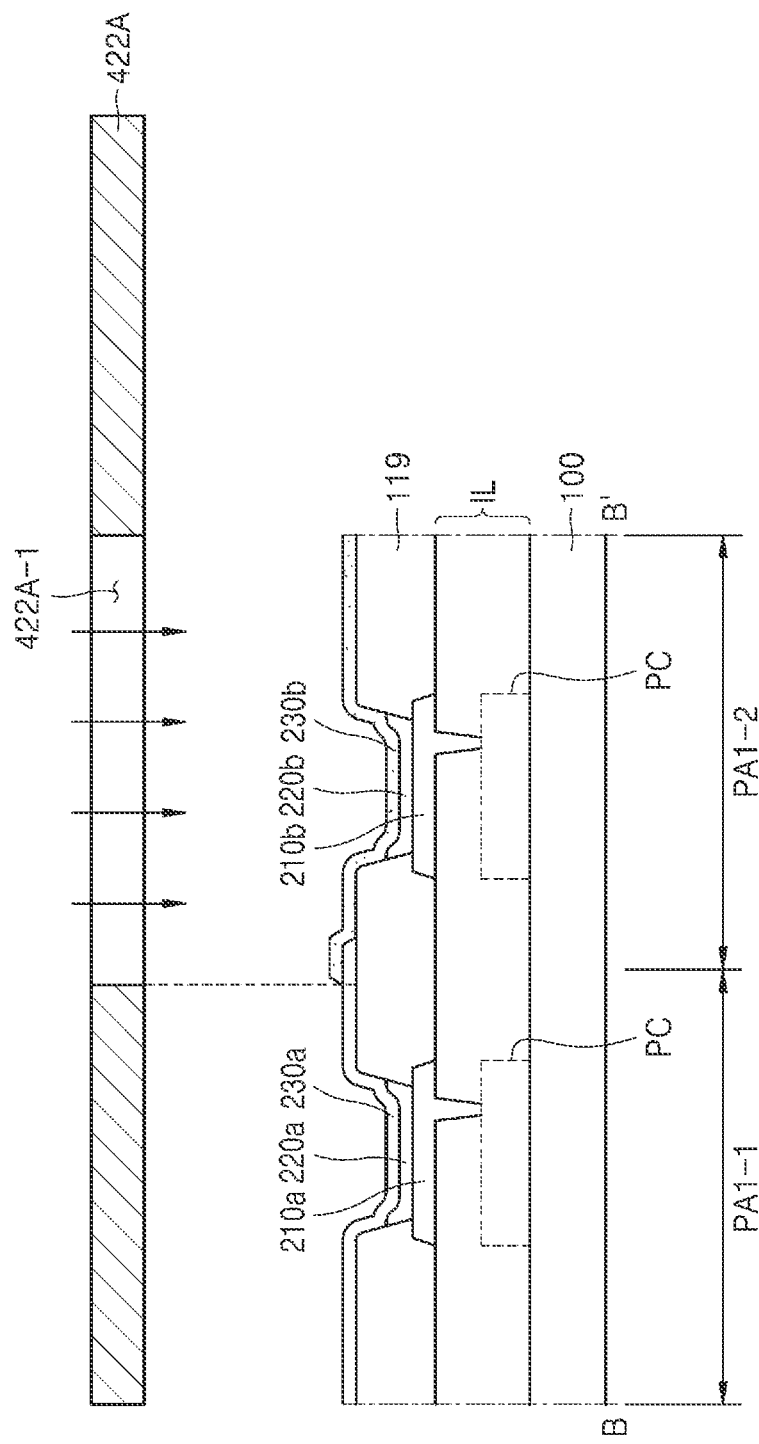
Figure 13:
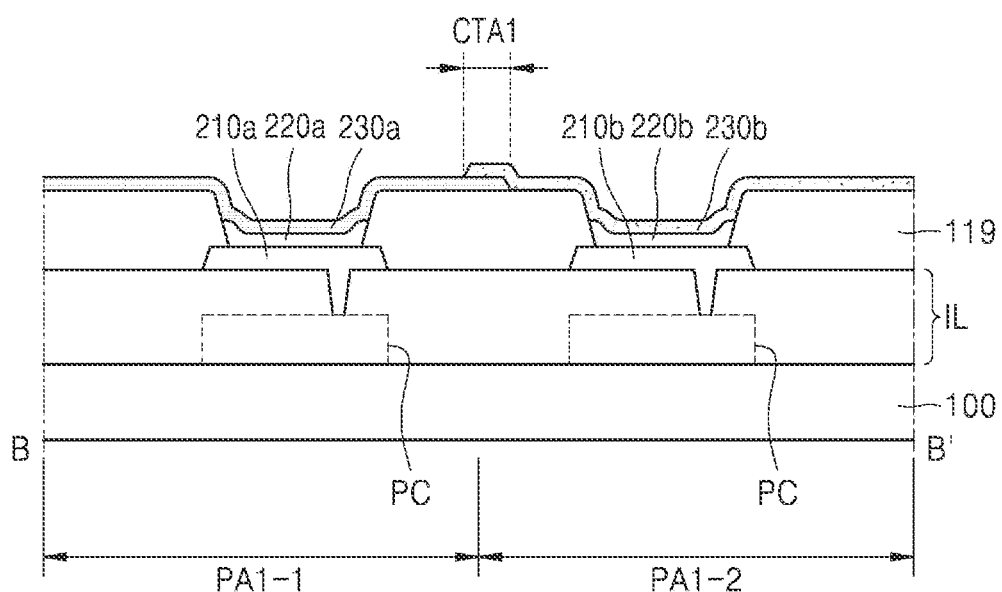
FIG. 13 is a cross-sectional view taken along the line B-B' of FIG. 9.

FIGS. 11 and 12 are cross-sectional views illustrating some of manufacturing processes of a display panel according to some example embodiments. FIG. 13 is a cross-sectional view taken along the line B-B' of FIG. 9.

Referring to FIGS. 11 to 13, the insulating layer IL in which the pixel circuit PC is located is formed on the substrate 100, and a first pixel electrode 210a and a second pixel electrode 210b electrically connected to the pixel circuit PC are formed. The first pixel electrode 210a is on the first pixel area PA1-1 and the second pixel electrode 210b is on the second pixel area PA1-2.

A pixel defining layer 119 having openings that expose central portions of the first and second pixel electrodes 210a and 210b is provided on the first and second pixel electrodes 210a and 210b. A first intermediate layer 220a is provided on an exposed portion of the first pixel electrode 210a and a second intermediate layer 220b is provided on an exposed portion of the second pixel electrode 210b, wherein the exposed portions are exposed through the openings of the pixel defining layer 119. It is understood that the first intermediate layer 220a and the second intermediate layer 220b include the same material as that of the intermediate layer 220 described above with reference to FIG. 8.

After that, the first opposite electrode 230a and the second opposite electrode 230b may be provided on the first intermediate layer 220a and the second intermediate layer 220b. According to some example embodiments, the first opposite electrode 230a and the second opposite electrode 230b may be obtained through different processes. Here, a first mask sheet 422A of a first mask assembly that will be described later may be used to form the first opposite electrode 230a and the second opposite electrode 230b. That is, after forming the first opposite electrode 230a, at least one of the first mask assembly or the substrate 100 is moved to a position that is different from an initial position, and then the second opposite electrode 230b may be formed on the substrate 100. According to some example embodiments, at least one of the first mask assembly or the substrate 100 is moved to a position that is different from an initial position after forming the second opposite electrode 230b, and then the first opposite electrode 230a may be formed on the substrate 100. Hereinafter, a case in which the second opposite electrode 230b is formed by moving the position of the substrate 100 after forming the first opposite electrode 230a will be described below in detail for convenience of description.

In detail, as shown in FIG. 11, the first opposite electrode 230a is formed on the first intermediate layer 220a. The first opposite electrode 230a may be formed when a deposition material that has passed through a first opening 422A-1 of the first mask sheet 422A is deposited on the substrate 100. After that, as shown in FIG. 12, the substrate 100 is moved to a left side in FIG. 11 to form the second opposite electrode 230b on the second intermediate layer 220b. The second opposite electrode 230b may be manufactured through the first opening 422A-1 of the first mask sheet 422A.

Referring to FIG. 13, the first opposite electrode 230a and the second opposite electrode 230b obtained as above may be in surface contact with each other in the first contact area CTA1. The surface contact between the first opposite electrode 230a and the second opposite electrode 230b may be understood that the second opposite electrode 230b is stacked on the first opposite electrode 230a to contact each other without any intervening layer therebetween.

In the first contact area CTA1, the second opposite electrode 230b is arranged on the first opposite electrode 230a. This denotes that the second opposite electrode 230b is obtained in a post-process of the forming of the first opposite electrode 230a. According to some example embodiments, when the second opposite electrode 230b is formed after the first opposite electrode 230a is formed, the first opposite electrode 230a may be arranged on the second opposite electrode 230b in the first contact area CTA1. The first contact area CTA1 may have a thickness less than twice the thickness of a region in which the first opposite electrode 230a or the second opposite electrode 230b is only arranged, because the first and second opposite electrodes 230a and 230b are in surface contact with each other in the first contact area CTA1. Also, the first contact area CTA1 may not be arranged on light-emitting regions of the first pixel PXa1 and the second pixel PXa2. Here, the light-emitting regions are formed in the pixel defining layer 119 and may be respectively defined as first and second openings OP1 and OP2 that expose the central portions of the first pixel electrode 210a and the second pixel electrode 210b. That is, the first contact area CTA1 may be provided without overlapping the first and second openings OP1 and OP2 formed in the pixel defining layer 119.

As an area of the first contact area CTA1 increases, the resistances of the first and second opposite electrodes 230a and 230b may be further reduced. However, as described above, when the area of the first contact area CTA1 is increased greater than a certain degree, the first contact area CTA1 overlaps the light-emitting regions of the first and second pixels PXa1 and PXa2, which degrade light-emitting performance of the first and second pixels PXa1 and PXa2.

Therefore, the area of the first contact area CTA1 may be provided so as not to shield the first and second openings OP1 and OP2.

Referring to FIGS. 11 and 13, the first transmission area TA1 may not include a display element such as the organic light-emitting diode OLED and the pixel circuit PC electrically connected to the display element, as compared with the first pixel area PA1-1. Moreover, the first transmission area TA1 may be deinfed as an area, in which some of the layers on the substrate 100 are removed.

Figure 14:
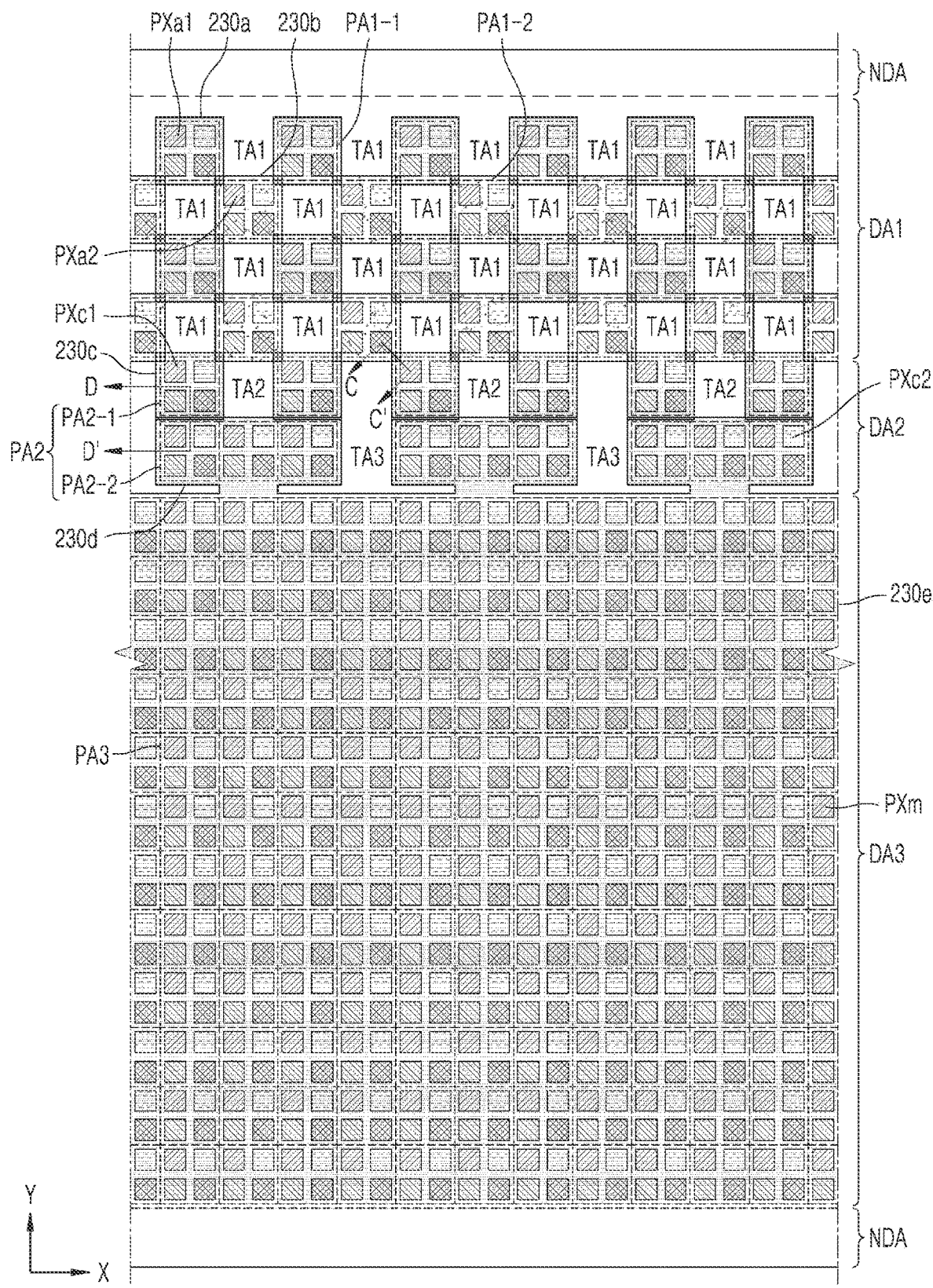
FIG. 14 is a plan view of an arrangement of opposite electrodes in a display panel according to some example embodiments.
Figure 15:
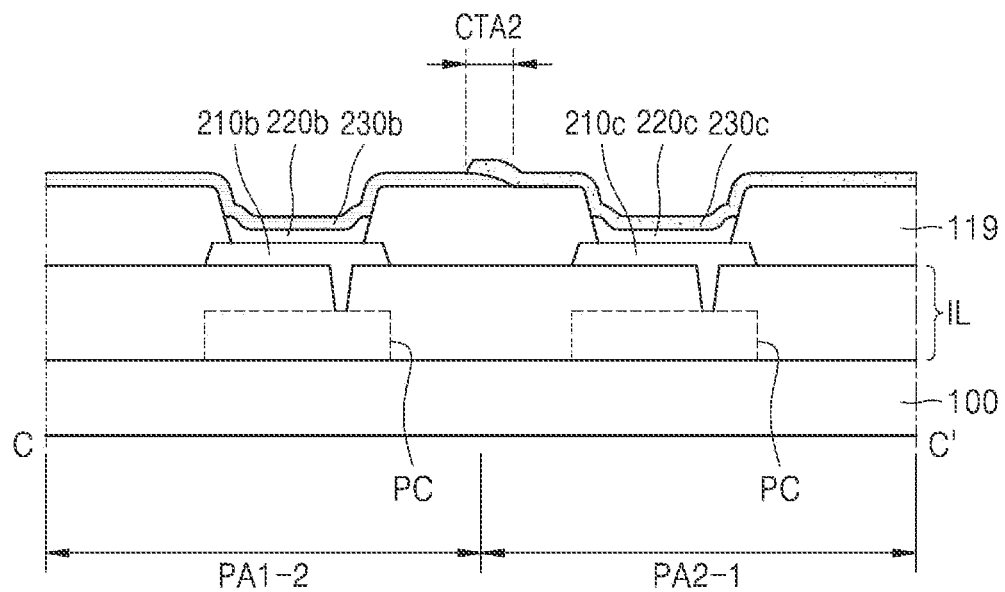
FIG. 15 is a cross-sectional view taken along the line C-C' of FIG. 14.
Figure 16:
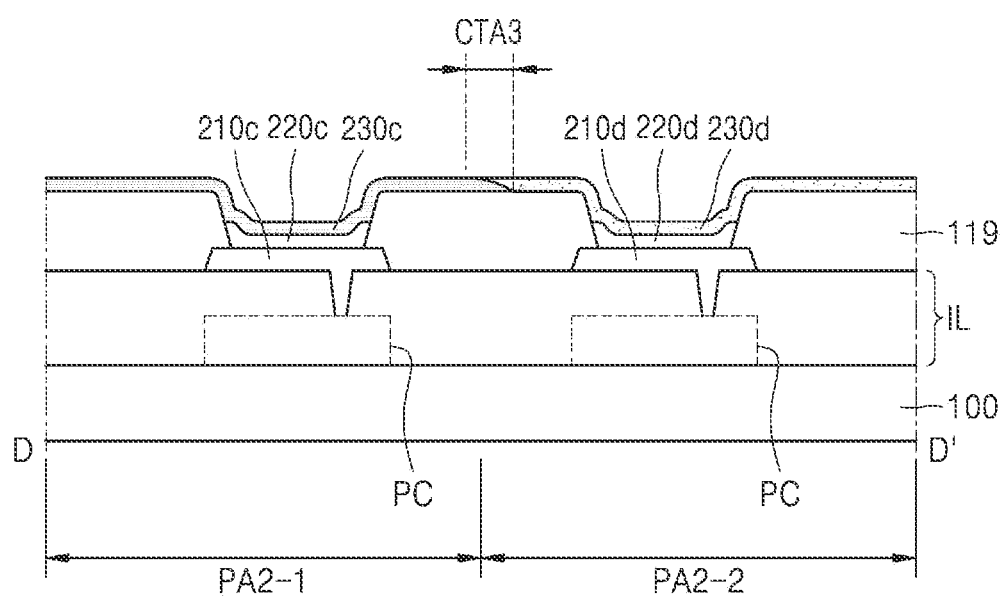
FIG. 16 is a cross-sectional view taken along the line D-D' of FIG. 14.

FIG. 14 is a plan view of arrangement of the opposite electrodes in a display panel according to some example embodiments. FIG. 15 is a cross-sectional view taken along the line C-C' of FIG. 14. FIG. 16 is a cross-sectional view taken along the line D-D' of FIG. 14.

Referring to FIGS. 14 to 16, the first display area DA1 may include the first pixel area PA1-1, the second pixel area PA1-2, and the first transmission area TA1, as described above. Here, the first opposite electrode 230a may be on the first pixel area PA1-1 and the second opposite electrode 230b may be on the second pixel area PA1-2.

The second display area DA2 may include a third pixel area PA2-1, a fourth pixel area PA2-2, the second transmission area TA2, and the third transmission area TA3. The connecting pixel area PA2 may include the third pixel area PA2-1 and the fourth pixel area PA2-2. Here, a third opposite electrode 230c may be on the third pixel area PA2-1 and a fourth opposite electrode 230d may be on the fourth pixel area PA2-2.

In the above case, the third opposite electrode 230c and the fourth opposite electrode 230d may have different shapes from each other. For example, the third opposite electrode 230c may have the same shape as that of the first opposite electrode 230a or the second opposite electrode 230b, and the fourth opposite electrode 230d may have a different shape from that of the third opposite electrode 230c. In particular, the third opposite electrode 230c may have a square shape and the fourth opposite electrode 230d may have a rectangular shape. Also, the fourth opposite electrode 230d may be equal to or larger than at least two third opposite electrodes 230c connected to each other.

The third display area DA3 may include a main pixel area PA3 and a main opposite electrode 230e may be on the main pixel area PA3.

In the above case, the third and fourth opposite electrodes 230c and 230d may be formed simultaneously with the forming of the main opposite electrode 230e.

A plurality of third opposite electrodes 230c and a plurality of fourth opposite electrodes 230d may be provided. The plurality of third opposite electrodes 230c may be spaced apart from one another. Also, the plurality of fourth opposite electrodes 230d may be spaced apart from one another. In this case, the plurality of third opposite electrodes 230c and the plurality of fourth opposite electrodes 230d may be respectively arranged in rows in an X-direction of FIG. 14. Also, each of the third opposite electrodes 230c and each of the fourth opposite electrodes 230d may be arranged in a Y-direction of FIG. 14 to be connected to each other.

The third opposite electrode 230c may be connected to the first opposite electrode 230a or the second opposite electrode 230b. Here, the third opposite electrode 230c may include a second contact area CTA2 overlapping with the first opposite electrode 230a or the second opposite electrode 230b. In this case, in the second contact area CTA2, the third opposite electrode 230c may be in surface contact with the first opposite electrode 230a or the second opposite electrode 230b. Also, in the second contact area CTA2, the third opposite electrode 230c may be arranged on the first opposite electrode 230a or the second opposite electrode 230b, or may be arranged under the first opposite electrode 230a or the second opposite electrode 230b. Hereinafter, for convenience of description, a case in which the third opposite electrode 230c is arranged on the second opposite electrode 230b in the second contact area CTA2 will be described below in detail.

In the above case, a thickness of the second contact area CTA2 may be greater than that of the second opposite electrode 230b or that of the third opposite electrode 230c. For example, the thickness of the second contact area CTA2 may be about twice the thickness of the second opposite electrode 230b or twice the thickness of the third opposite electrode 230c.

In the above case, the third opposite electrode 230c and the fourth opposite electrode 230d connected to each other may have a third contact area CTA3, in which the first and fourth opposite electrodes 230c and 230d overlap each other. In this case, a thickness of the third contact area CTA3 may be the same as or similar to the thickness of the third opposite electrode 230c or the thickness of the fourth opposite electrode 230d. That is, because the third opposite electrode 230c and the fourth opposite electrode 230d are simultaneously formed in the third contact area CTA3, one of the third opposite electrode 230c and the fourth opposite electrode 230d may directly contact an upper surface of the other of the third opposite electrode 230c and the fourth opposite electrode 230d. In this case, the third opposite electrode 230c and the fourth opposite electrode 230d may be in surface contact with each other. Hereinafter, for convenience of description, a case in which the fourth opposite electrode 230d is on the third opposite electrode 230c as shown in FIG. 15 will be described below in detail.

The fourth opposite electrode 230d may be connected to the main opposite electrode 230e. Here, the fourth opposite electrode 230d may be partially spaced apart from the main opposite electrode 230e, and may be partially in direct contact with the main opposite electrode 230e. Here, the fourth opposite electrode 230d has a 'T'-shape to be connected to the main opposite electrode 230e. That is, a part of the fourth opposite electrode 230d may protrude towards the main opposite electrode 230e, and another part of the fourth opposite electrode 230d may protrude in a direction perpendicular to the part of the fourth opposite electrode 230d.

The second transmission area TA2 may be located among the first opposite electrode 230a, the second opposite electrode 230b, and the third opposite electrode 230c. The second transmission area TA2 may have the same shape and size as those of the first transmission area TA1.

The third transmission area TA3 may be arranged among one of the first opposite electrode 230a and the second opposite electrode 230b, the third opposite electrode 230c, and the fourth opposite electrode 230d. Here, the third transmission area TA3 may have a different shape as that of the second transmission area TA2.

In each of the first pixel area PA1-1, the second pixel area PA1-2, the third pixel area PA2-1, and the fourth pixel area PA2-2, one or more pixels may be arranged. For example, the first pixel PXa1 may be arranged in the first pixel area PA1-1 and the second pixel PXa2 may be arranged in the second pixel area PA1-2. Also, one or more third pixel PXc1 is arranged in the third pixel area PA2-1 and one or more fourth pixel PXc2 may be arranged in the fourth pixel area PA2-2. Also, the main pixel PXm may be arranged in the main pixel area PA3. The above pixels are the same as or similar to the above description.

Figure 17:
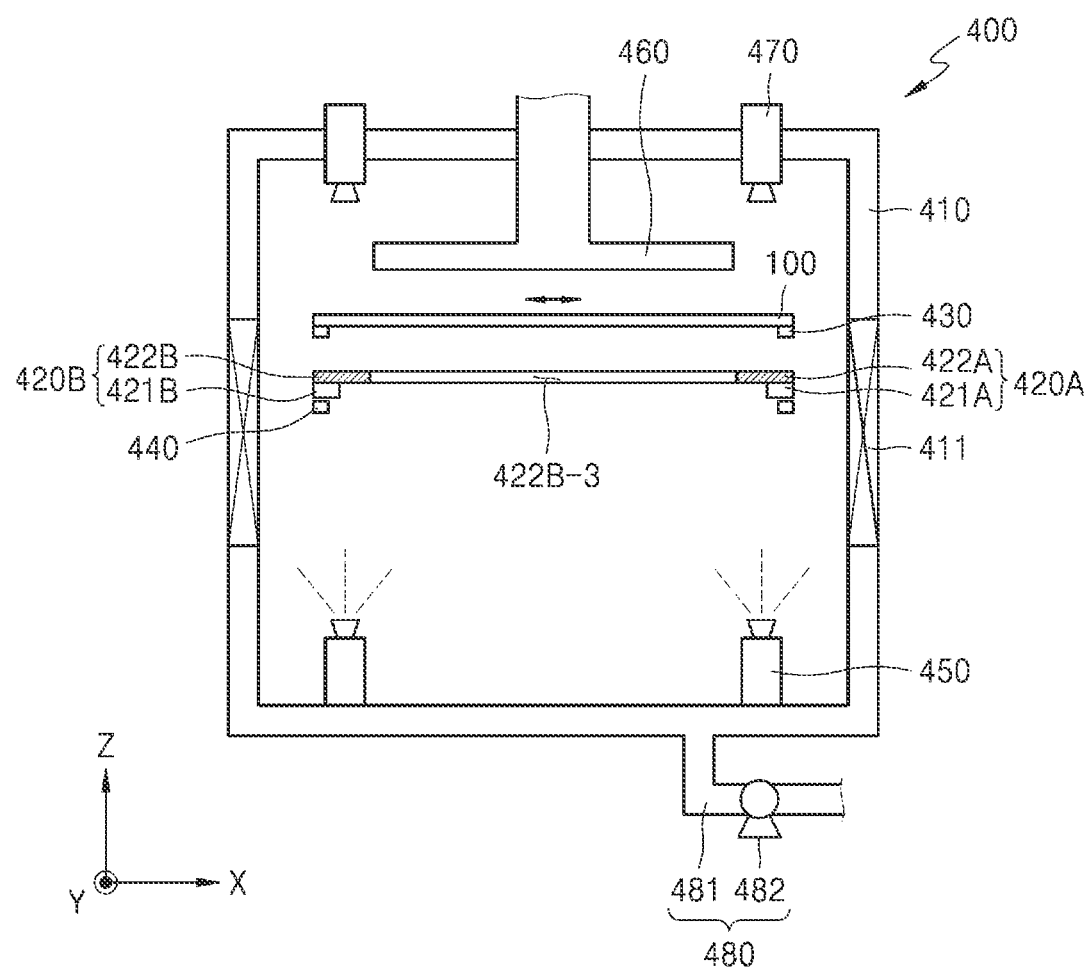
FIG. 17 is a cross-sectional view of an apparatus for manufacturing a display apparatus, according to some example embodiments.
Figure 18:
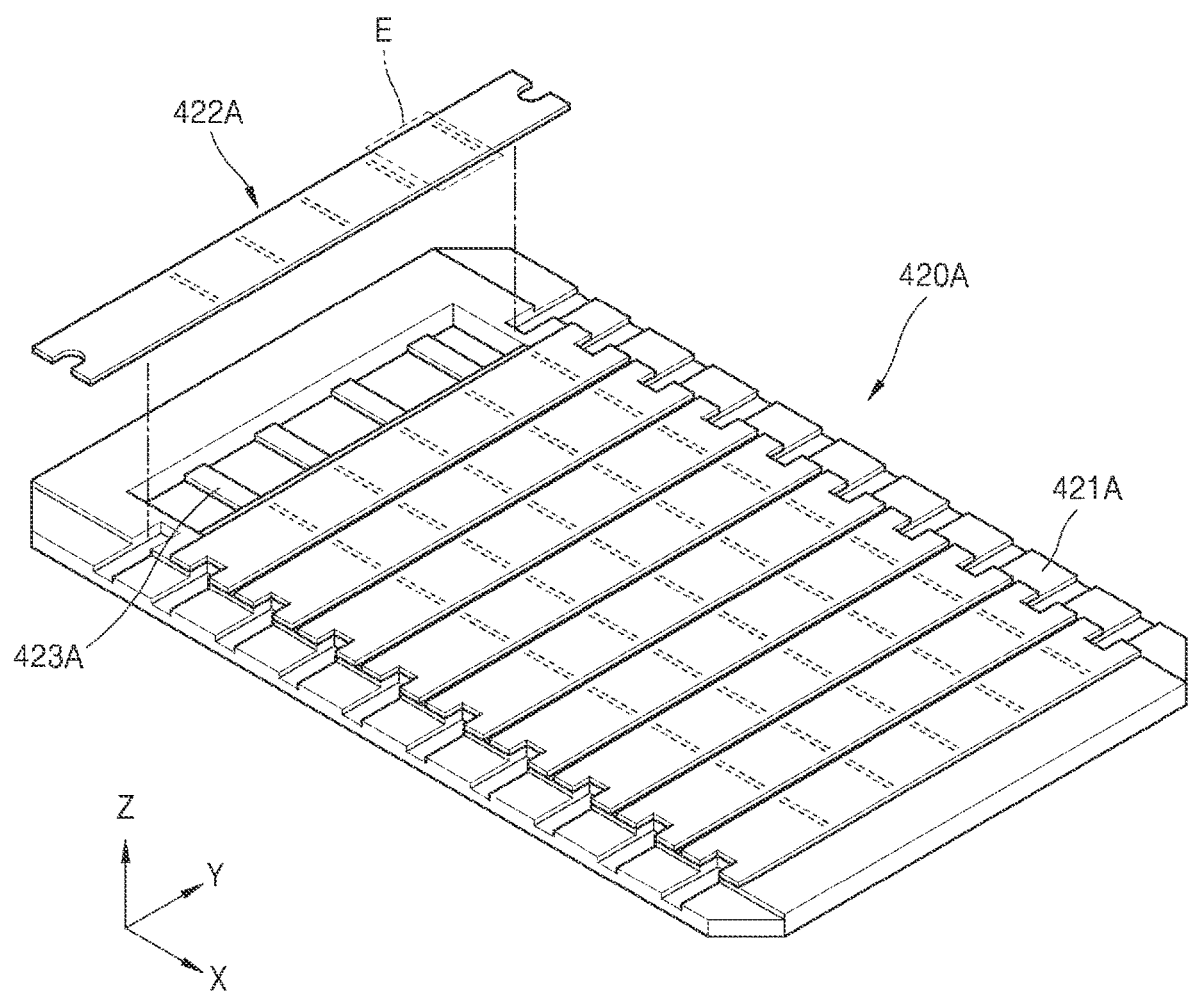
FIG. 18 is a perspective view of a first mask assembly of FIG. 17, according to some example embodiments.
Figure 19:
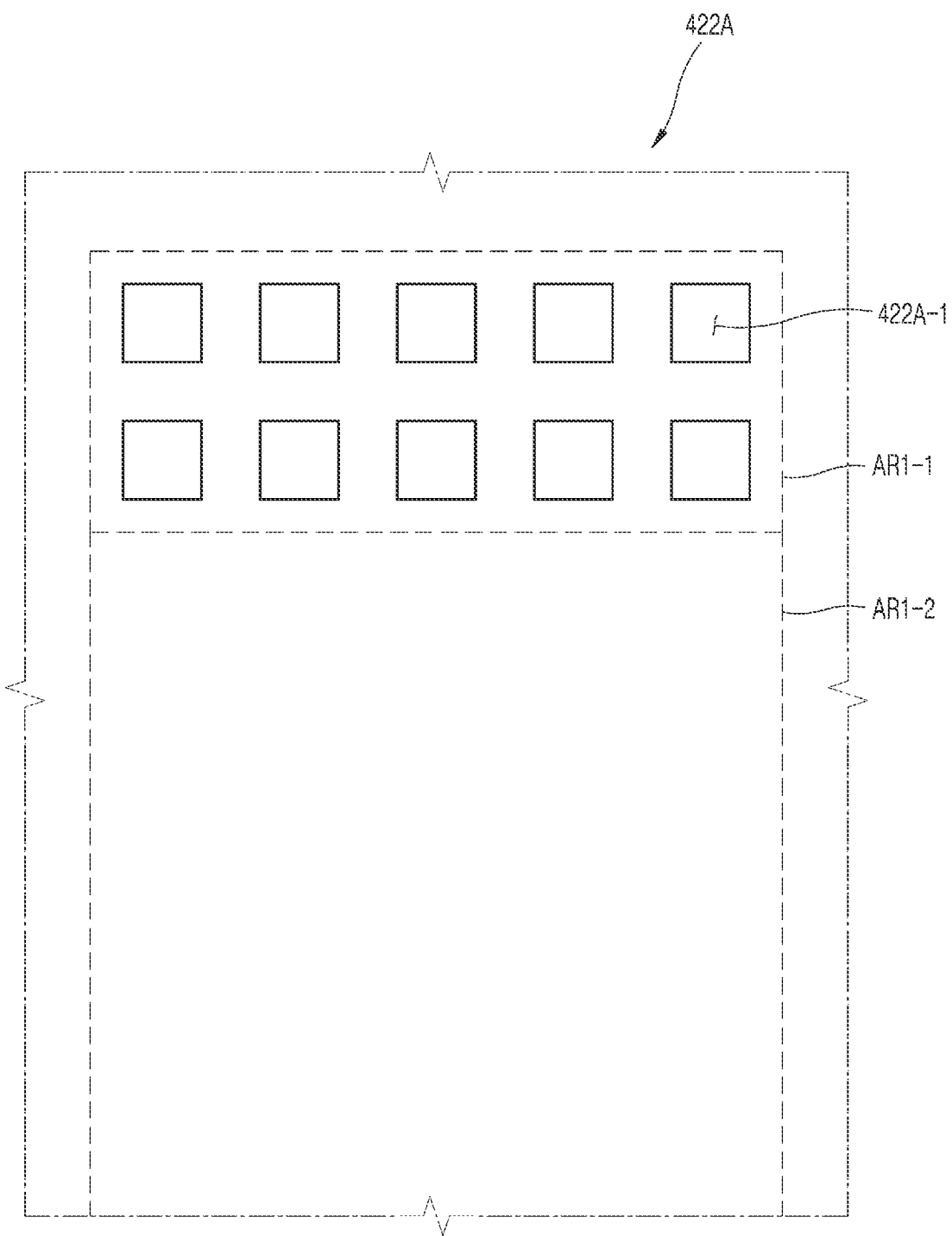
FIG. 19 is a plan view showing a portion of a first mask sheet of FIG. 17, according to some example embodiments.
Figure 20:
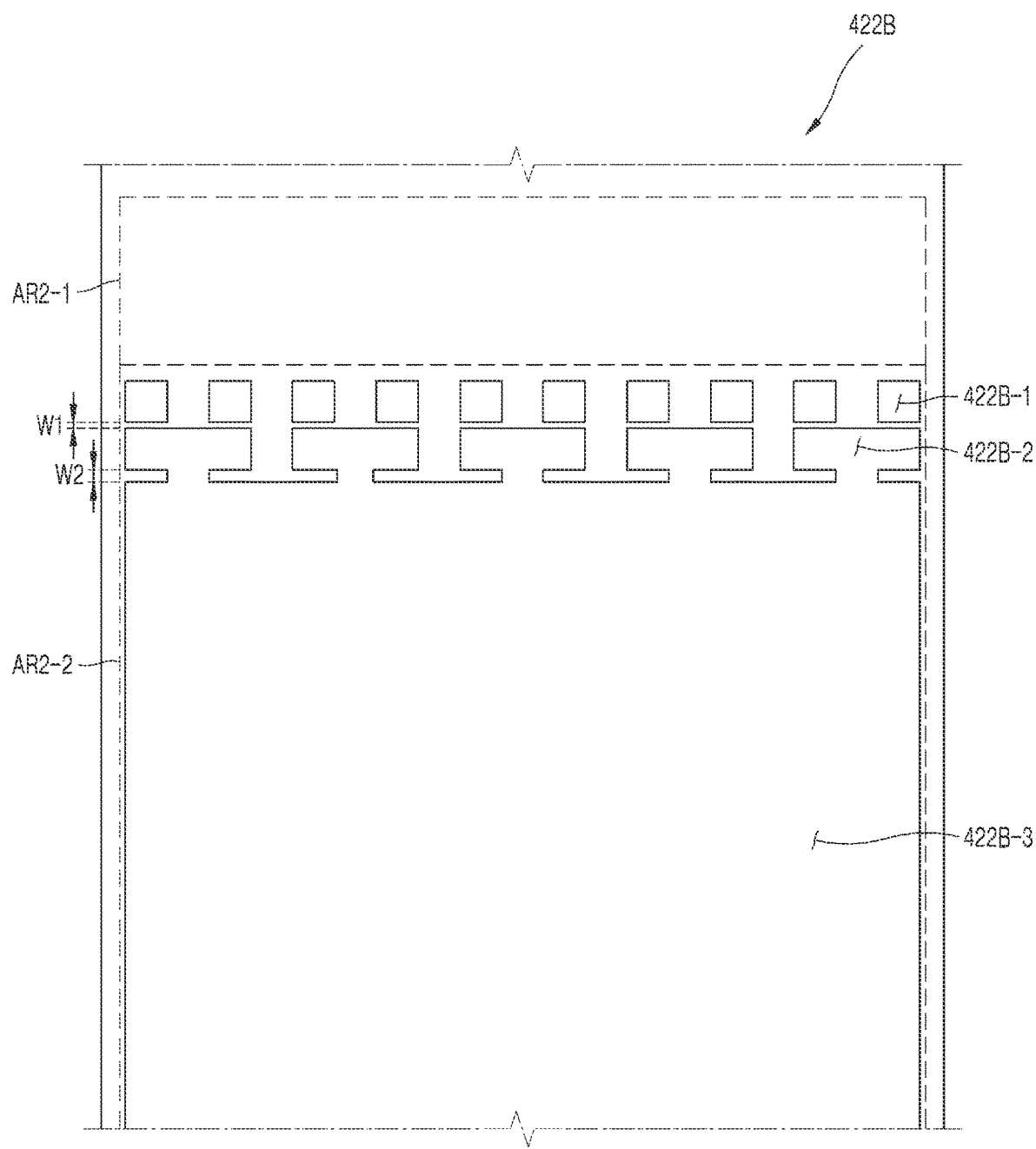
FIG. 20 is a plan view showing a portion of a second mask sheet of FIG. 17, according to some example embodiments.

FIG. 17 is a cross-sectional view of an apparatus for manufacturing the display apparatus 1, according to some example embodiments. FIG. 18 is a perspective view of a first mask assembly 420A of FIG. 17. FIG. 19 is a plan view showing a portion of a first mask sheet 422A of FIG. 17. FIG. 20 is a plan view showing a portion of a second mask sheet 422B of FIG. 17.

Referring to FIGS. 17 to 20, a display panel of the display apparatus 1 may be manufactured by using an apparatus 400 for manufacturing the display apparatus.

The apparatus 400 for manufacturing the display apparatus may include a chamber 410, the first mask assembly 420A, the second mask assembly 420B, a first support 430, a second support 440, a deposition source 450, a magnetic force generator 460, a vision portion 470, and a pressure adjuster 480.

The chamber 410 may include a space therein and may have an opening part. Here, a gate valve 411 may be provided at the opening part of the chamber 410 to open/close the opening part.

The first mask assembly 420A may be optionally in the chamber 410. Here, the first mask assembly 420A may include a first mask frame 421A and the first mask sheet 422A. The first mask frame 421A includes a plurality of frames connected to one another and may have an opening therein. Here, the first mask frame 421A may include one opening or a plurality of first openings 422A-1 that are distinguished from one another. In this case, the first mask frame 421A may be formed as a grating such as a window frame. The first mask sheet 422A may be fixed at the first mask frame 421A in a tensed state. Here, the first mask sheet 422A may have a first opening through which a deposition material may pass.

The first mask sheet 422A may include the first openings 422A-1, through which the deposition material passes to form the first opposite electrode or the second opposite electrode described above.

The first opening 422A-1 may have a shape corresponding to that of the first pixel area PA1-1 or the second pixel area PA1-2. For example, the first opening 422A-1 may have a rectangular shape, a square shape, or a rhombus shape. In the above case, the deposition material that has passed through the first opening 422A-1 is deposited on the substrate 100 to form the first opposite electrode or the second opposite electrode. When there are plurality of first openings 422A-1, the plurality of first openings 422A-1 may be spaced apart sufficiently from one another, and thus the deposition material that has passed through each of the first openings 422A-1 may not be connected to the other deposition materials after being deposited on the substrate 100.

The first opening 422A-1 may be arranged to form the opposite electrode on a region corresponding to the first display area DA1 of the substrate 100. In particular, the first opening 422A-1 may be arranged only in a first area AR1-1 of the first mask sheet 422A. In this case, a second area AR1-2 of the first mask sheet 422A may not include an additional opening. The first area AR1-1 may correspond to the first display area DA1 of the substrate 100 and the second area AR1-2 may correspond to the second display area DA2 and the third display area DA3 of the substrate 100.

The second mask assembly 420B may be replaced with the first mask assembly 420A. That is, the second mask assembly 420B may be used to form the the third opposite electrode, the fourth opposite electrode, and the main opposite electrode on the second display area DA2 and the third display area DA3, after forming the first opposite electrode and the second opposite electrode on the first display area DA1 by using the first mask assembly 420A.

The second mask assembly 420B may include a second mask frame 421B and the second mask sheet 422B. The second mask frame 421B is similar to or the same as the first mask frame 421A, and detailed descriptions thereof are omitted here.

The second mask sheet 422B may include a second opening 422B-1, a third opening 422B-2, and a fourth opening 422B-3 for forming the third opposite electrode, the fourth opposite electrode, and the main opposite electrode.

The second opening 422B-1 may have a shape that is the same as that of the first opening 422A-1. The third opening 422B-2 may have a different shape from that of the second opening 422B-1. For example, the third opening 422B-2 may be greater than the second opening 422B-1. In this case, the third opening 422B-2 may have a size corresponding to at least two second openings 422B-1. The second opening 422B-1 may be separated from the third opening 422B-2. Here, a first width W1 of the second mask sheet 422B between the second opening 422B-1 and the third opening 422B-2 is sufficiently small so that the deposition materials that have passed respectively through the second opening 422B-1 and the third opening 422B-2 and deposited on the substrate 100 may be connected to each other.

The fourth opening 422B-3 may be connected to the third opening 422B-2. A second width W2 of the second mask sheet 422B between the fourth opening 422B-3 and the third opening 422B-2 is greater than the first width W1, and thus only a part of the fourth opposite electrode may be connected to the main opposite electrode. In this case, due to the portions of the second mask sheet 422B, which is between the second opening 422B-1 and the third opening 422B-2 and between the third opening 422B-2 and the fourth opening 422B-3, a strength of the second mask sheet 422B may be ensured to a certain degree when the second mask sheet 422B is tensed.

The second to fourth openings 422B-1 to 422B-3 may be in the third area AR2-1 of the second mask sheet 422B, which corresponds to the second area AR1-2 of the first mask sheet 422A. However, an additional opening may not be provided in a fourth area AR2-2 of the second mask sheet 422B, which corresponds to the first area AR1-1 of the first mask sheet 422A.

The substrate 100 may be mounted on a first support 430. Here, the first support 430 may adjust a location of the substrate 100. For example, the first support 430 may include a UVW stage.

The first mask assembly 420A or the second mask assembly 420B may be mounted on a second support 440. Here, similarly to the first support 430, the second support 440 may adjust a location of the first mask assembly 420A or the second mask assembly 420B.

The deposition source 450 may vaporize or sublimate a deposition material to supply the deposition material to the chamber 410, after accommodating the deposition material. Here, the deposition source 450 may include a heater therein, and heats the deposition material in the deposition source 450 by using the heater to melt or sublimate the deposition material. In the above case, the deposition source 450 may be arranged at a center or a corner of the chamber 410. Hereinafter, for convenience of description, a case in which the deposition source 450 is at a corner of the chamber 410 will be described below in detail.

The magnetic force generator 460 is in the chamber 410 to allow the substrate 100 and the first mask assembly 420A or the substrate 100 and the second mask assembly 420B to be in close contact with each other. Here, the magnetic force generator 460 may include an electromagnet or a permanent magnet that generates a magnetic force.

The vision portion 470 is in the chamber 410 to photograph locations of the first mask assembly 420A and the substrate 100 or locations of the second mask assembly 420B and the substrate 100. Here, the vision portion 470 may photograph an alignment mark, etc., of at least one of the first mask assembly 420A, the second mask assembly 420B, or the substrate 100.

The pressure adjuster 480 may be connected to the chamber 410 to adjust a pressure in the chamber 410. The pressure adjuster 480 may include a connecting pipe 481 connected to the chamber 410 and a pump 482 provided on the connecting pipe 481.

The display apparatus 1 may be manufactured by the apparatus 400 for manufacturing the display apparatus. Here, the apparatus 400 for manufacturing the display apparatus may manufacture the display apparatus 1 according to one or more embodiments that will be described below, as well as the embodiments described above. Hereinafter, for convenience of description, a case in which the apparatus 400 for manufacturing the display apparatus manufactures the pixel area of the display panel shown in FIG. 14 will be described below in detail. Hereinafter, like reference numerals as those of FIG. 14 denote the same elements.

In detail, the substrate 100 on which an insulating layer is formed and the first mask assembly 420A may be arranged in the chamber 410. Here, the pixel electrode and the organic light-emitting layer of the thin film transistor and the organic light-emitting diode may have been formed.

After mounting the substrate 100 and the first mask assembly 420A respectively on the first support 430 and the second support 440, the substrate 100 and the first mask assembly 420A may be photographed by the vision portion 470. After that, the substrate 100 and the first mask assembly 420A may be aligned.

When the deposition source 450 operates and supplies the deposition material, the deposition material may pass through the first openings 422A-1 of the first mask sheet 422A and may be deposited on the organic light-emitting layer and the pixel defining layer of the substrate 100. Here, the deposition material that has passed through the first opening 422A-1 may form the first opposite electrode 230a or the second opposite electrode 230b as described above. Hereinafter, a case in which the deposition material forms the first opposite electrode 230a will be described in detail for convenience of description.

When the deposition material is deposited as above, the first opposite electrodes 230a may be arranged in a column. There may be a plurality of columns that are spaced apart from one another.

When the above process is finished, a position of at least one of the substrate 100 or the first mask assembly 420A may be changed. For example, after fixing the position of the first mask assembly 420A, the position of the substrate 100 may be changed. According to some example embodiments, after fixing the position of the substrate 100, the position of the first mask assembly 420A may be changed. According to some example embodiments, positions of both the substrate 100 and the first mask assembly 420A may be changed. Hereinafter, for convenience of description, a case in which the position of the substrate 100 is changed whereas the position of the first mask assembly 420A is fixed will be described in detail.

When the position of the substrate 100 is changed, the first opening 422a may be arranged to correspond to a portion of the substrate 100, where the first opposite electrode 230a is not formed. That is, the first opening 422A-1 may be arranged between two adjacent first opposite electrodes 230a.

After changing the position of the substrate 100, when the deposition source 450 supplies the deposition material, the deposition material may pass through the first opening 422A-1 and may be deposited on the substrate 100. The deposition material that has passed through the first opening 422A-1 may be deposited on the substrate 100 to form the second opposite electrode 230b. The second opposite electrode 230b is arranged between the first opposite electrodes 230a and may be connected to the first opposite electrode 230a via the first contact area CTA1.

When the above process is finished, the operation of the deposition source 450 is stopped or the deposition source 450 is blocked to supply the deposition material, and then the internal pressure of the chamber 410 may be maintained at an atmospheric pressure level via the pressure adjuster 480.

After opening the gate valve 411, the first mask assembly 420A is withdrawn from the inside of the chamber 410 to outside, and the second mask assembly 420B may be carried into the chamber 410 from the outside of the chamber 410. When the second mask assembly 420B is mounted on the second support 440, the second mask assembly 420B and the substrate 100 may be aligned. Also, the pressure adjuster 480 may maintain the internal pressure of the chamber 410 at a similar level to the vacuum state. The deposition source 450 supplies the deposition material onto the substrate 100 to form the third opposite electrode 230c, the fourth opposite electrode 230d, and the main opposite electrode 230e on the substrate 100.

In detail, when the third opposite electrode 230c is formed on the substrate 100, the third opposite electrode 230c may be connected to one of the first opposite electrode 230a and the second opposite electrode 230b. When the third opposite electrode 230c is formed, the second contact area CTA2 may be provided between the third opposite electrode 230c and one of the first opposite electrode 230a and the second opposite electrode 230b. In the second contact area CTA2, the third opposite electrode 230c may be arranged on an upper surface of one of the first opposite electrode 230a and the second opposite electrode 230b. According to some example embodiments, the third opposite electrode 230c, the fourth opposite electrode 230d, and the main opposite electrode 230e are formed on the substrate 100, and then the first opposite electrode 230a and the second opposite electrode 230b are sequentially formed. In this case, one of the first opposite electrode 230a and the second opposite electrode 230b may be arranged on the upper surface of the third opposite electrode 230c.

When the third opposite electrode 230c and the fourth opposite electrode 230d are formed as described above, the first width W1 of the second mask sheet 422B between the second opening 422B-1 and the third opening 422B-2 is sufficiently small so that the the third opposite electrode 230c and the fourth opposite electrode 230d on the substrate 100 may overlap each other to be connected to each other.

Therefore, the opposite electrodes arranged on the substrate 100 may be connected to one another via the contact areas.

Also, the apparatus 400 for manufacturing the display apparatus may prevent the pixels in each display area from not emitting light, by connecting the opposite electrodes on the display area DA to one another.

Figure 21:
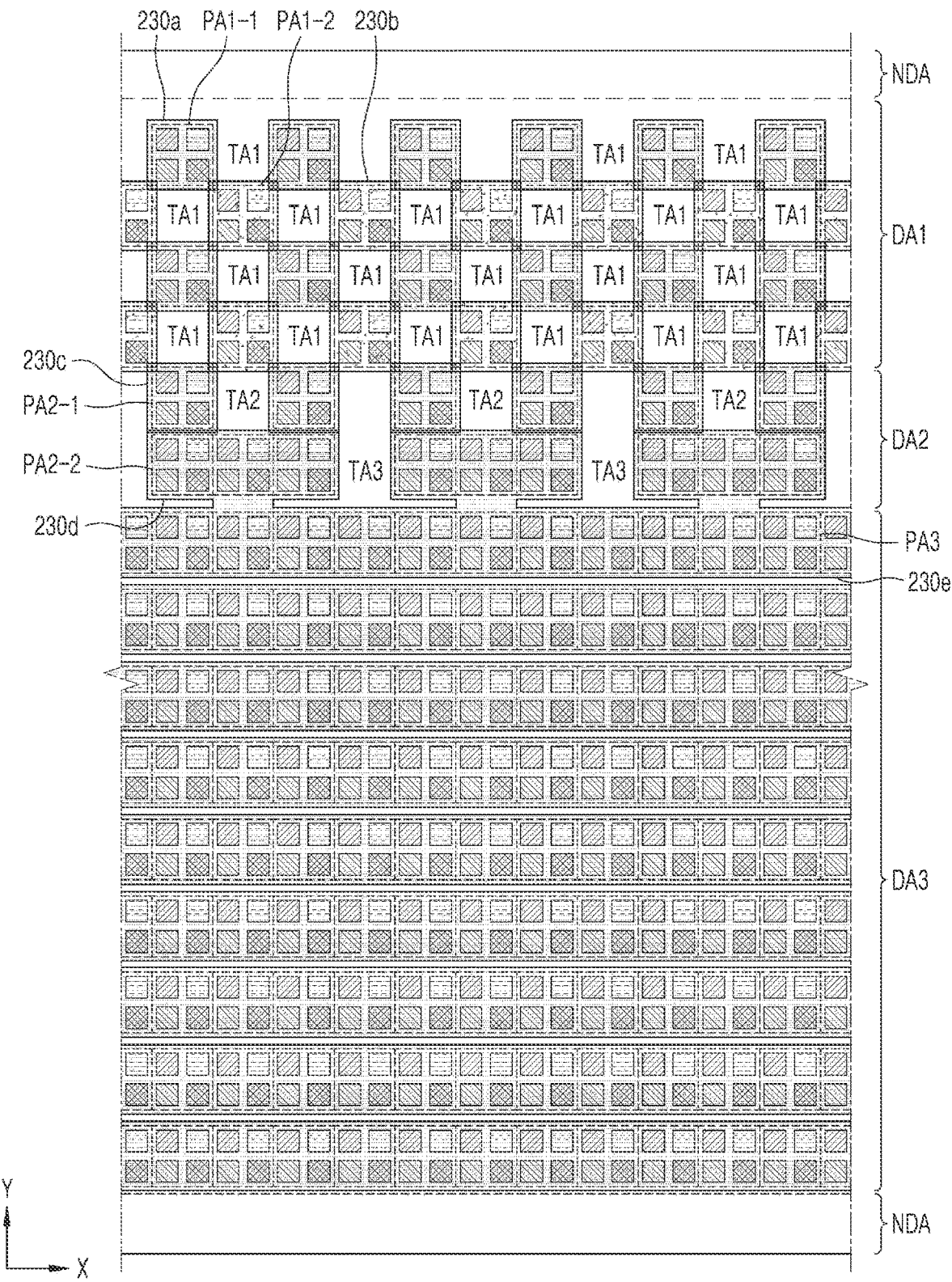
FIG. 21 is a plan view of an arrangement of opposite electrodes in a display panel according to some example embodiments.
Figure 22:
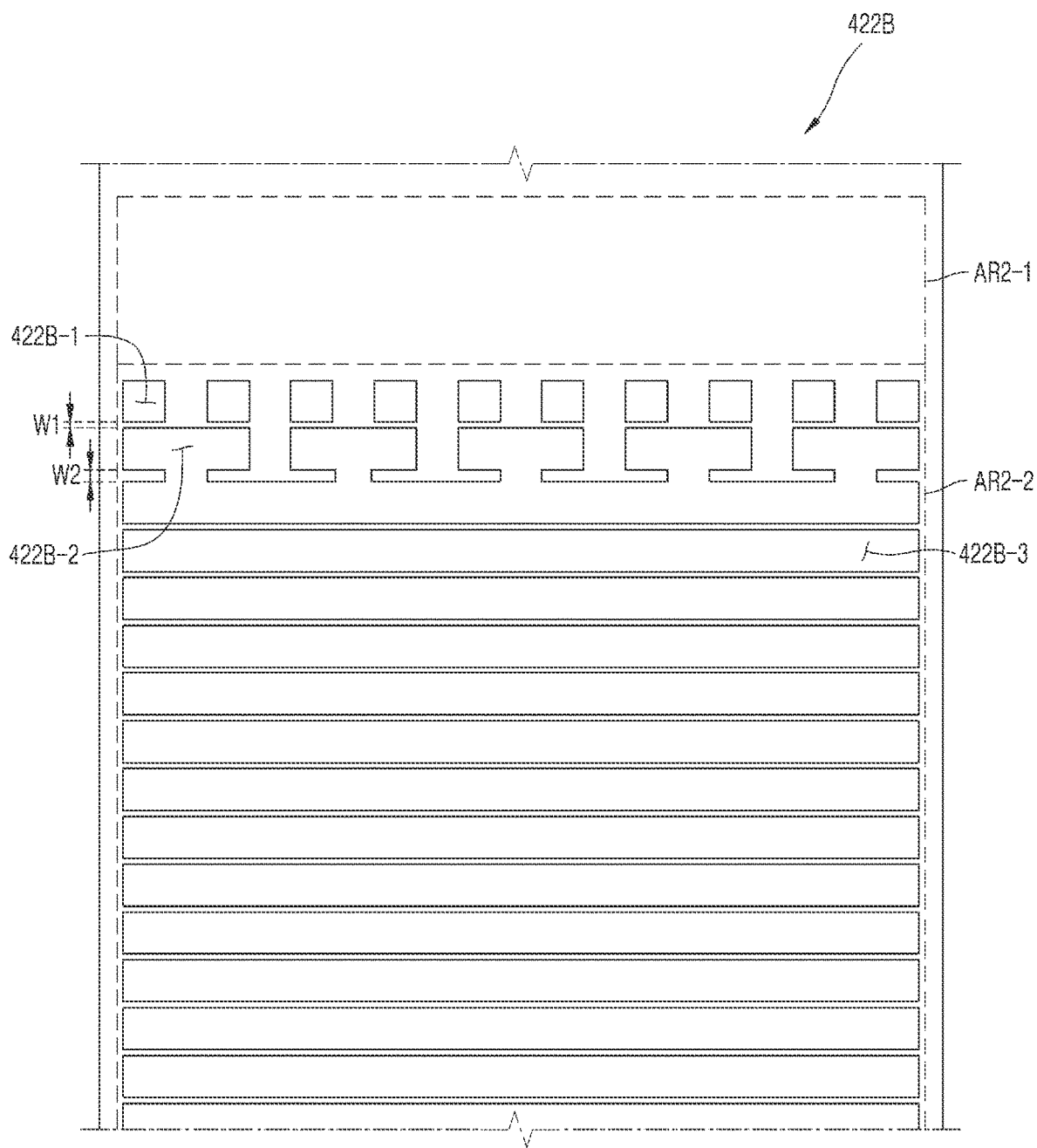
FIG. 22 is a plan view showing a portion of a second mask sheet of FIG. 17, according to some example embodiments.

FIG. 21 is a plan view of arrangement of the opposite electrodes in a display panel according to some example embodiments. FIG. 22 is a plan view showing a portion of the second mask sheet 422B of FIG. 17, according to some example embodiments.

Referring to FIGS. 21 and 22, the display apparatus 1 may be similar to that described above with reference to FIGS. 1 to 14. Hereinafter, for convenience of description, differences from the arrangement of opposite electrodes shown in FIG. 14 will be described in detail.

The first to fourth opposite electrodes 230a, 230b, 230c, and 230d may be the same as those of FIG. 14. A plurality of main opposite electrodes 230e may be spaced apart from one another. Here, the plurality of main opposite electrodes 230e may be arranged in a Y-direction of FIG. 21. In this case, each of the main opposite electrodes 230e may not be connected to the other, and one of the plurality of main opposite electrodes 230e may be connected to a plurality of fourth opposite electrodes 230d. Here, each of the main opposite electrodes 230e may be connected to each of the wirings arranged on a side surface of the substrate 100.

In order to form the main opposite electrodes 230e, the second mask sheet 422B may include fourth openings 422B-3 that are spaced apart from one another. Here, a plurality of fourth openings 422B-3 may be arranged in a direction to be spaced apart from one another. The second mask sheet 422B is partially arranged between adjacent fourth openings 422B-3 to distinguish adjacent fourth openings 422B-3 from one another.

In the above case, the deposition material that has passed through the fourth openings 422B-3 may form the main opposite electrodes 230e on the third display area DA3, and as described above, the deposition material that has passed through different fourth openings 422B-3 may be deposited on different regions of the substrate 100 to form different main opposite electrodes 230e from one another.

Figure 23:
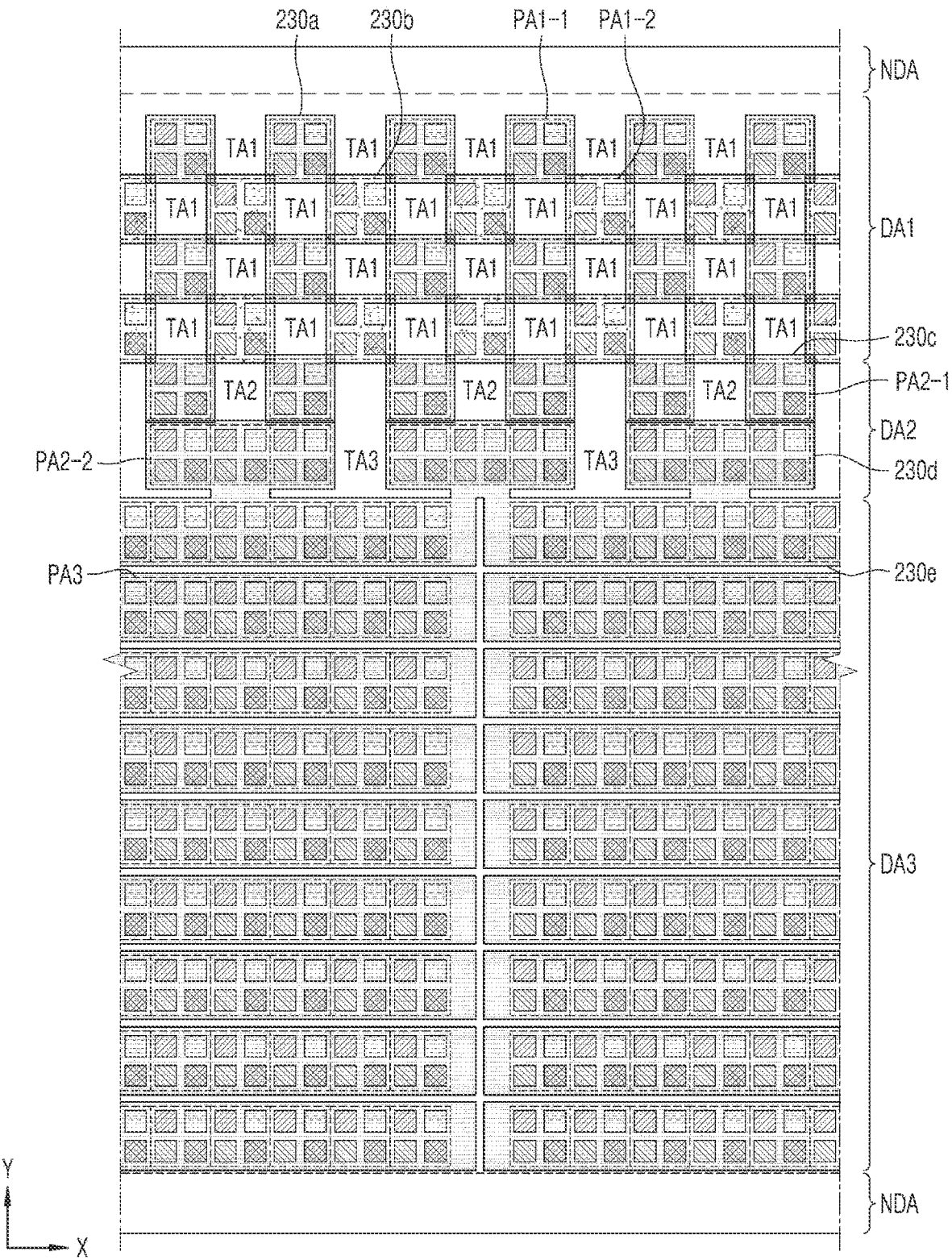
FIG. 23 is a plan view of arrangement of opposite electrodes in a display panel according to some example embodiments.
Figure 24:
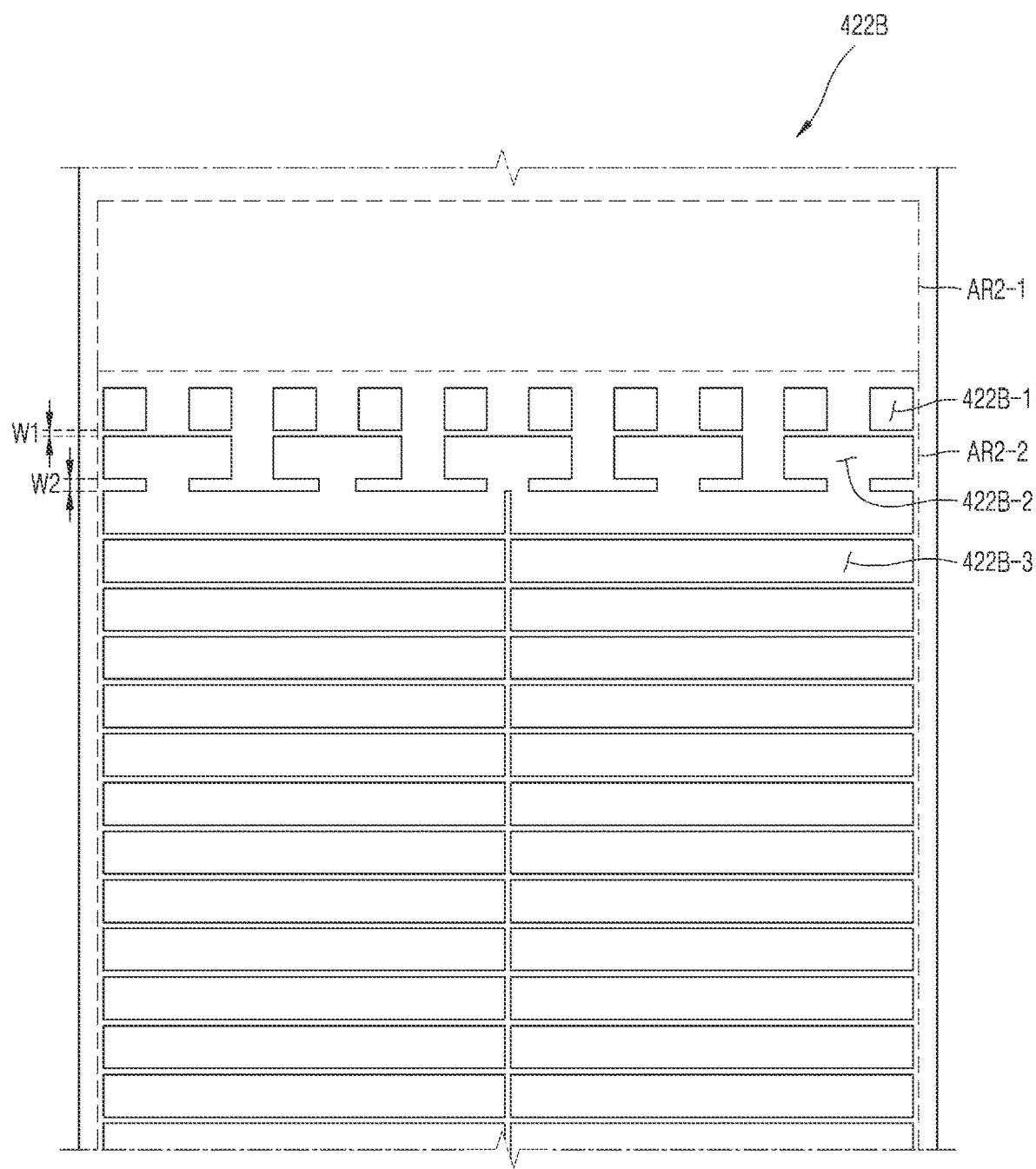
FIG. 24 is a plan view showing a portion of a second mask sheet of FIG. 17, according to some example embodiments.

FIG. 23 is a plan view of arrangement of opposite electrodes in a display panel according to some example embodiments. FIG. 24 is a plan view showing a portion of the second mask sheet 422B of FIG. 17, according to some example embodiments.

Referring to FIGS. 23 and 24, the display apparatus 1 may be similar to that described above with reference to FIGS. 1 to 14. Hereinafter, for convenience of description, differences from the arrangement of opposite electrodes shown in FIG. 14 will be described in detail.

The first to fourth opposite electrodes 230a, 230b, 230c, and 230d may be the same as those of FIG. 14. A plurality of main opposite electrodes 230e may be spaced apart from one another. Here, the plurality of main opposite electrodes 230e may be arranged in a Y-axis direction of FIG. 23. In particular, two main opposite electrodes 230e may be arranged in an X-axis direction of FIG. 23. In this case, the two main opposite electrodes 230e may not be connected to each other, but separated from each other. The main opposite electrodes 230e may not be connected to one another, and some of the plurality of main opposite electrodes 230e may be connected respectively to the fourth opposite electrodes 230d. Here, each of the main opposite electrodes 230e may be connected to each of the wirings arranged on a side surface of the substrate 100.

In order to form the main opposite electrodes 230e, the second mask sheet 422B may include fourth openings 422B-3 that are spaced apart from one another. Here, a plurality of fourth openings 422B-3 may be arranged in a direction and in another direction to be spaced apart from one another. The second mask sheet 422B is partially arranged between adjacent fourth openings 422B-3 to distinguish adjacent fourth openings 422B-3 from one another. That is, among the plurality of fourth openings 422B-3, two fourth openings 422B-3 are arranged in one column and a plurality of columns each having two fourth openings 422B-3 are arranged in a plurality of rows.

In the above case, the deposition material that has passed through the fourth openings 422B-3 may form the main opposite electrodes 230e on the third display area DA3, and as described above, the deposition material that has passed through different fourth openings 422B-3 may be deposited on different regions of the substrate 100 to form different main opposite electrodes 230e from one another.

According to one or more embodiments, the display panel having an expanded display area may be implemented to display images even on an area in which components are arranged and the display apparatus including the display panel may be implemented. However, the scope of the disclosure is not limited to the above effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A method of manufacturing a display apparatus, the method comprising:
    arranging a substrate and a first mask assembly in a chamber;
    forming a plurality of first opposite electrodes respectively on a first display area and a second display area of the substrate by using a deposition material from a deposition source through the first mask assembly;
    changing a position of at least one of the substrate or the first mask assembly;
    forming a plurality of second opposite electrodes respectively on the first display area and the second display area by using the deposition material from the deposition source through the first mask assembly, the first opposite electrode, and the second opposite electrode at least partially overlapping each other; and
    forming a third opposite electrode and a fourth opposite electrode on the second display area after replacing the first mask assembly with a second mask assembly and supplying a deposition material onto the substrate from the deposition source, and forming a main opposite electrode on a third display area of the substrate,
    wherein the third opposite electrode connects one of the first opposite electrode and the second opposite electrode to the fourth opposite electrode, and the third opposite electrode and the fourth opposite electrode have different planar areas from each other.

2. The method of claim 1, wherein a first transmission area is provided between the first opposite electrodes and the second opposite electrodes.

3. The method of claim 1, wherein the first opposite electrodes and the second opposite electrodes are partially in surface contact with each other.

4. The method of claim 1, wherein a second transmission area is provided between one of the first opposite electrodes and the second opposite electrodes, the third opposite electrode and the fourth opposite electrode, and a third transmission area is between one of the first opposite electrodes and the second opposite electrodes, the third opposite electrode, the fourth opposite electrode, and a main opposite electrode.

5. The method of claim 4, wherein
    the second transmission area and the third transmission area have different shapes from each other.

6. The method of claim 1, wherein the first display area is configured to display an image having a resolution less than a resolution of an image displayed by at least one of the second display area or the third display area.

7. The method of claim 1, wherein a light transmittance of the first display area is different from a light transmittance of at least one of the second display area or the third display area.

8. The method of claim 7, wherein the light transmittance of the second display area is greater than the light transmittance of the first display area and less than the light transmittance of the third display area.

* * * * *